(12) United States Patent
Shuman

(10) Patent No.: US 11,495,131 B2
(45) Date of Patent: Nov. 8, 2022

(54) VEHICLE TO VEHICLE SAFETY MESSAGING CONGESTION CONTROL FOR PLATOONING VEHICLES

(71) Applicant: QUALCOMM Incorporated, San Diego, CA (US)

(72) Inventor: Mohammed Ataur Rahman Shuman, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 383 days.

(21) Appl. No.: 16/797,302

(22) Filed: Feb. 21, 2020

(65) Prior Publication Data

US 2021/0264793 A1    Aug. 26, 2021

(51) Int. Cl.
| | |
|---|---|
| G08G 1/00 | (2006.01) |
| G08G 1/16 | (2006.01) |
| G08G 1/01 | (2006.01) |
| H04W 52/28 | (2009.01) |
| H04W 4/46 | (2018.01) |
| H04W 52/10 | (2009.01) |

(Continued)

(52) U.S. Cl.
CPC ............ *G08G 1/22* (2013.01); *G08G 1/0145* (2013.01); *G08G 1/163* (2013.01); *H04W 4/027* (2013.01); *H04W 4/46* (2018.02); *H04W 52/10* (2013.01); *H04W 52/282* (2013.01); *H04W 52/283* (2013.01); *H04W 52/285* (2013.01); *H04W 52/386* (2013.01)

(58) Field of Classification Search
CPC ........ G08G 1/22; G08G 1/0145; G08G 1/163; H04W 4/40–48; H04W 52/10; H04W 52/28; H04W 52/282; H04W 52/283; H04W 52/285
See application file for complete search history.

(56) References Cited

U.S. PATENT DOCUMENTS

| | | | |
|---|---|---|---|
| 6,973,053 B1 * | 12/2005 | Passman | ................ H04L 45/04 370/242 |
| 10,332,403 B2 | 6/2019 | Saigusa | |
| 10,440,668 B1 | 10/2019 | Wu | |

(Continued)

FOREIGN PATENT DOCUMENTS

EP            2276012 B1      8/2014

*Primary Examiner* — Robert C Scheibel
(74) *Attorney, Agent, or Firm* — The Marbury Law Group, PLLC

(57) ABSTRACT

Various embodiments include methods that may be implementing in a computing system within vehicles for supporting communicating proxy basic safety communications while operating within a platoon of vehicles to control congestion on frequencies used for basic safety communications. In various embodiments, while a vehicle is operating as a designated platoon vehicle, the computing system may generate a proxy basic safety communication including position and dimension information of the platoon as a whole, and broadcast the proxy basic safety communication on behalf of vehicles in the platoon. The proxy basic safety communication may include positions of certain vehicles within and dimensions of the platoon. While in a platoon but not operating as the designated platoon vehicle, the computing system may not broadcast basic safety communications or broadcast such communications at low power.

30 Claims, 10 Drawing Sheets

(51) Int. Cl.
*H04W 4/02* (2018.01)
*H04W 52/38* (2009.01)

(56) References Cited

U.S. PATENT DOCUMENTS

| | | | |
|---|---|---|---|
| 2010/0238855 A1* | 9/2010 | Yoshida | H04B 7/155 370/315 |
| 2010/0256836 A1* | 10/2010 | Mudalige | G08G 1/164 701/25 |
| 2010/0256852 A1* | 10/2010 | Mudalige | G08G 1/164 701/24 |
| 2019/0051158 A1 | 2/2019 | Felip et al. | |
| 2019/0239035 A1* | 8/2019 | Chae | H04W 52/283 |
| 2020/0003861 A1* | 1/2020 | Eriksson | B60R 21/01 |
| 2020/0090521 A1* | 3/2020 | Kim | H04W 4/46 |
| 2021/0041893 A1* | 2/2021 | Matsumoto | G08G 1/22 |
| 2021/0043090 A1* | 2/2021 | Park | H04W 4/08 |
| 2022/0131803 A1* | 4/2022 | Ko | H04W 92/18 |

* cited by examiner

VEHICLE TO VEHICLE SAFETY MESSAGING CONGESTION CONTROL FOR PLATOONING VEHICLES

BACKGROUND

With the advent of fully driverless or semi-driverless vehicles, congestion/overload of the vehicle-to-anything (V2X) safety traffic channel is one of the main challenges of the V2X communication system deployment. As more vehicles support cellular-V2X (C-V2X) technology, congestion of the ITS channel could become an issue that limits usefulness of this technology. Local congestion conditions will worsen when platooning vehicles use C-V2X, as platooning involves multiple vehicles driving together in a relatively close formation. When platooning vehicles use the same schedule for generating Basic Safety Messages (BSM) and Cooperative Awareness Messages (CAM), an unnecessary load could be placed on the safety channel, particularly in the vicinity of the platoon.

Currently, application layer congestion control changes a rate that messages are transmitted based on vehicle density, speed, acceleration etc. Thus, when there is traffic congestion (i.e., high density) but no platooning, vehicles will typically be traveling at low speeds or acceleration, and thus broadcasting safety messages less frequently to control congestion on the BSM and CAM frequencies may be acceptable. However, platooning will result in dense packing of vehicles that could be moving a freeway speed, and thus broadcasting safety messages less frequently to control congestion on the BSM and CAM frequencies could be dangerous. Currently, no application layer congestion control exists to safely address congestion due to platooning of vehicles.

SUMMARY

Various aspects include methods that may be executed by a processor or computing device for supporting communicating proxy basic safety communications while operating within a platoon of vehicles. Various aspects may include, while operating as a designated platoon vehicle, generating a proxy basic safety communication including position and dimension information of the platoon as a whole, and broadcasting the proxy basic safety communication on behalf of vehicles in the platoon. In some aspects, broadcasting the proxy basic safety communication may include broadcasting the proxy basic safety communication using more power than basic safety communications are broadcast by vehicles not acting as a designated platoon vehicle. Some aspects may further include not broadcasting basic safety communications while in a platoon and not operating as the designated platoon vehicle. Some aspects may further include broadcasting basic safety communications using a reduced power level while in a platoon and not operating as the designated platoon vehicle.

In some aspects, the position and dimension information of the platoon included in the proxy basic safety communication may include a location of a first vehicle in the platoon, a location of a last vehicle in the platoon, a number of vehicles in the platoon, and a speed of vehicles in the platoon. In some aspects, the position and dimension information of the platoon included in the proxy basic safety communication further may include a number of roadway lanes occupied by vehicles in the platoon. In some aspects, the proxy basic safety communication further may include a destination of the platoon.

Some aspects may further include cooperating on contents included in the proxy basic safety communication with a second vehicle in the platoon that is also designated to broadcast basic safety communications on behalf of the platoon such that the vehicle generates and broadcasts a first proxy basic safety communication for a first subgroup of the platoon and the second vehicle generates and broadcasts a second proxy basic safety communication for a second subgroup of the platoon. Some aspects may further include ceasing broadcasting the proxy basic safety communications on behalf of the platoon in response to another vehicle becoming the designated platoon vehicle in the platoon.

Some aspects may further include receiving position and speed information from other vehicles in the platoon transmitted on a frequency different from the frequency on which the proxy basic safety communications are broadcast, and using the position and speed information from other vehicles in the platoon when generating the proxy basic safety communications. Some aspects may further include while not operating as the designated platoon vehicle, transmitting vehicle position and speed information to the designated platoon vehicle in the platoon using a frequency different from the frequency on which the proxy basic safety communications are broadcast.

Some aspects may further include operating at a front or rear of the platoon while operating as the designated platoon vehicle.

Further aspects include a vehicle including a processor configured with processor-executable instructions to perform operations of any of the methods summarized above. Further aspects include a processing device for use in a vehicle in which the processor is configured with processor-executable instructions to perform operations of any of the methods summarized above. Further aspects include a non-transitory processor-readable storage medium having stored thereon processor-executable software instructions configured to cause a processor to perform operations of any of the methods summarized above. Further aspects include a processing device configured for use in a vehicle and to perform operations of any of the methods summarized above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the various embodiments.

DETAILED DESCRIPTION

Figure 1A:
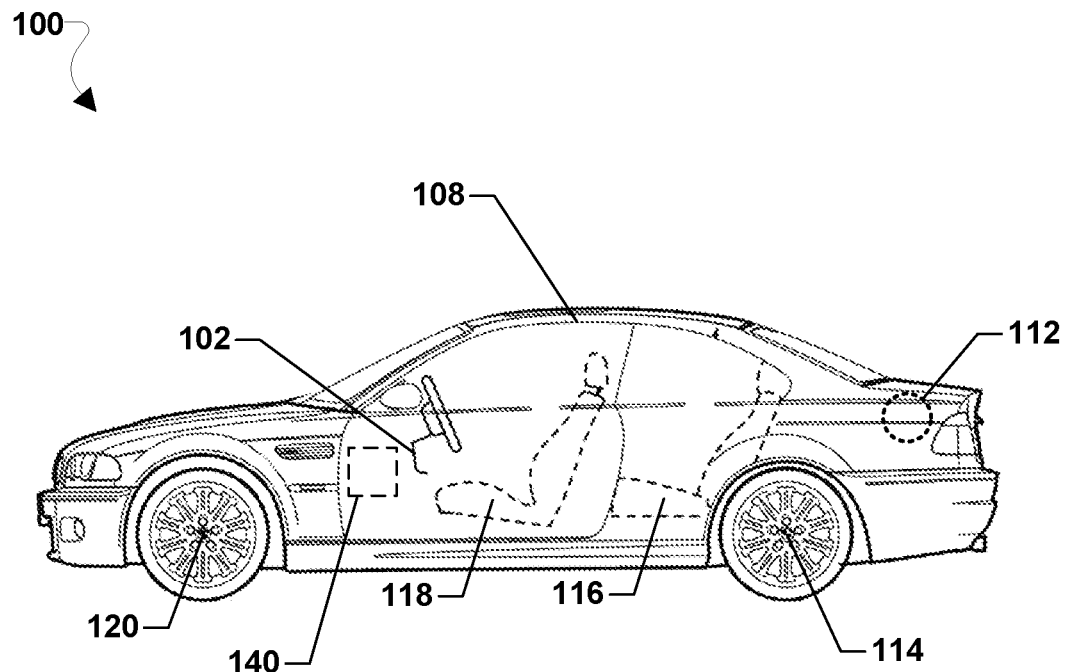
FIGS. 1A and 1B are component block diagrams illustrating a vehicle suitable for implementing various embodiments.

Various aspects will be described in detail with reference to the accompanying drawings. Wherever possible, the same reference numbers will be used throughout the drawings to refer to the same or like parts. References made to particular examples and embodiments are for illustrative purposes and are not intended to limit the scope of the various aspects or the claims.

Various embodiments include methods and processing devices implementing such methods for reducing congestion on frequencies used to broadcast BSM and CAM messages by enabling one or a few vehicles (referred to as a "designated vehicle") within a platoon to broadcast proxy safety messages (e.g., BSM and/or CAM messages) on behalf of the platoon so that other vehicles in the platoon can refrain from broadcasting such messages or broadcast such messages at reduced power levels.

As used herein the terms "roadway" or "roadways" refer to a way, path, or pathway leading from one place to another, especially one with a specially prepared surface which vehicles can use for travel. A roadway may be an intended and/or planned path of travel, whether or not on a prepared surface.

As used herein the terms "platoon" or "platooning" refer to vehicle operating modes in which two or more vehicles cooperate steering and speed controls to drive together in a relatively close formation. Platooning vehicles may operate with smaller than usual distances between vehicles and even optionally couple to one another (e.g., mechanically and/or electromagnetically). Platooning offers benefits of increased traffic density, and thus reductions in roadway congestion, as well as improved fuel performance due to slip streaming.

As used herein, the term "basic safety communication" refers to vehicle to vehicle messaging configured to promote safety therebetween. Basic safety communications may include basic safety messages (BSM) and Cooperative Awareness Messages (CAM), which may be required for some vehicle safety applications and/or operating modes. Basic safety communications may be defined in safety standards (e.g., SAE J2735) that specify core vehicle data elements to be communicated (e.g., vehicle size, position, speed, heading, acceleration, etc.) and may include vehicle event data (e.g., when braking systems engaged) or other information. Basic safety communications may be broadcast approximately 10 times per second over C-V2X PC5 Interface, such as at power levels that enable reception up to about 1,000 meters.

Methods for vehicle to vehicle safety messaging congestion control may be useful for vehicles organized and traveling within a platoon. Platooning enables a group of vehicles to travel together in a collaborative manner that allows the vehicles to pack closer together than is safe for vehicles operating independently. A platoon control plan may be used to organize, maintain, and/or control the group of vehicles in a formation. The platoon control plan may be determined by a single vehicle, which may be referred to as the "leader." Within the platoon, in accordance with the platoon control plan, each participating vehicle assumes a single position in the formation. The leader vehicle may coordinate the overall platoon movement. The other vehicles in the platoon (referred to herein as "followers") may follow directions provided by the leader to the extent those directions do not conflict with other directions a vehicle is programmed to follow (e.g., operating as the designated platoon vehicle). However, the leader vehicle need not be the lead vehicle in the platoon. Platooning allows vehicles to achieve a number of beneficial results, including increased fuel efficiency, congestion efficiency, collision risk mitigation, freeing the driver(s) to focus attention away from the road, and other benefits.

In accordance with various embodiments, the platoon control plan may select one or more vehicles in the platoon to operate as a "designated platoon vehicle" for the purpose of broadcasting safety messages (e.g., BSM and/or CAM messages) on behalf of other vehicles in the platoon (referred to herein as "proxy basic safety communications"). Each designated platoon vehicle may be configured to generate and broadcast a proxy basic safety communication on behalf of the platoon as a whole. This enables the other vehicles in the platoon to stop broadcasting basic safety messages, or to broadcast such messages at reduced power levels, thereby reducing the range at which such messages can be received (e.g., <<1000 meters). The vehicle(s) selected to be the designated platoon vehicle may be chosen based on that vehicle's position (i.e., location) within the platoon, capabilities to broadcast the proxy basic safety communication (e.g., strongest transmitter), authorization to operate as the designated platoon vehicle, and/or other factors or characteristics. In addition, the selection of the one or more vehicles in the platoon to operate as a designated platoon vehicle may rotate (i.e., in a round-robin manner) or otherwise change periodically.

The surface transportation industry has increasingly looked to leverage the growing capabilities of cellular and wireless communication technologies through the adoption of Intelligent Transportation Systems (ITS) technologies to increase intercommunication and safety for both driver-operated vehicles and autonomous vehicles. Vehicle-to-everything (V2X) protocols (including vehicle-to-vehicle (V2V), vehicle-to-infrastructure (V2I), vehicle-to-network communications (V2N), and vehicle-to-pedestrian (V2P) protocols), and particularly the cellular V2X (C-V2X) protocol defined by the 3rd Generation Partnership Project (3GPP), support(s) ITS technologies and serves as the foundation for vehicles to communicate directly with the communication devices around them.

C-V2X defines two transmission modes that, together, provide a 360° non-line-of-sight awareness and a higher level of predictability for enhanced road safety and autonomous driving. A first transmission mode includes direct C-V2X, which includes V2V, V2I, and V2P, and that provides enhanced communication range and reliability in the dedicated ITS 5.9 gigahertz (GHz) spectrum that is independent of a cellular network. A second transmission mode includes V2N communications in mobile broadband systems and technologies, such as third generation wireless mobile communication technologies (3G) (e.g., global system for mobile communications (GSM) evolution (EDGE) systems, code division multiple access (CDMA) 2000 systems, etc.), fourth generation wireless mobile communication technologies (4G) (e.g., long term evolution (LTE)

systems, LTE-Advanced systems, mobile Worldwide Interoperability for Microwave Access (mobile WiMAX) systems, etc.), fifth generation wireless mobile communication technologies (5G) (e.g., 5G New Radio (5G NR) systems, etc.), etc.

The term "system-on-chip" (SOC) is used herein to refer to a set of interconnected electronic circuits typically, but not exclusively, including one or more processors, a memory, and a communication interface. The SOC may include a variety of different types of processors and processor cores, such as a general purpose processor, a central processing unit (CPU), a digital signal processor (DSP), a graphics processing unit (GPU), an accelerated processing unit (APU), a sub-system processor, an auxiliary processor, a single-core processor, and a multicore processor. The SOC may further embody other hardware and hardware combinations, such as a field programmable gate array (FPGA), a configuration and status register (CSR), an application-specific integrated circuit (ASIC), other programmable logic device, discrete gate logic, transistor logic, registers, performance monitoring hardware, watchdog hardware, counters, and time references. SOCs may be integrated circuits (ICs) configured such that the components of the ICs reside on the same substrate, such as a single piece of semiconductor material (e.g., silicon, etc.).

Autonomous and semi-autonomous vehicles, such as cars, trucks, buses, etc., are becoming a reality on city streets and other roads. Autonomous and semi-autonomous vehicles typically include a plurality of sensors, including cameras, radar, and lidar, that collect information about the environment surrounding the vehicle. For example, such collected information may enable the vehicle to recognize the roadway, identify objects to avoid, and track the movement and future position of other vehicles to enable partial or fully autonomous navigation.

Various embodiments can reduce congestion on frequencies used for broadcasting basic safety messages by vehicles organized and traveling within a platoon, thereby resolving a communication problem that would be caused by platooning. By designating one or a few vehicles to broadcast basic safety messages on behalf of all vehicles in the platoon, the same amount of safety information may be communicated to all vehicles on the roadway while reducing the number of basic safety messages broadcast per unit time. This may enable wide scale implementation of platooning to take advantage of the fuel economy and safety advantages of coordinated high-density platoons while avoiding congestion on communication frequencies that would otherwise require transmitting basic vehicle safety messages (e.g., BSM and/or CSM) less frequently (i.e., increasing the period between transmissions) with the attendant safety implications.

Figure 1B:
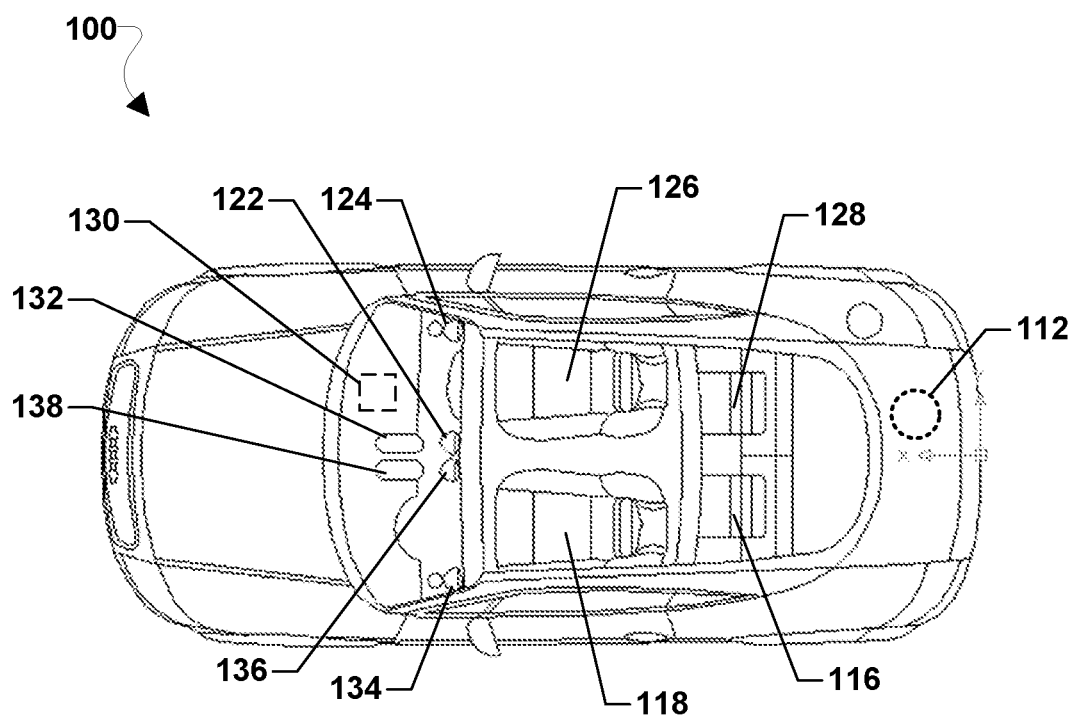

Various embodiments may be implemented within a variety of vehicles, an example vehicle 100 of which is illustrated in FIGS. 1A and 1B. With reference to FIGS. 1A and 1B, a vehicle 100 may include a control unit 140 and a plurality of sensors 102-138, including satellite geo-positioning system receivers 108, occupancy sensors 112, 116, 118, 126, 128, tire pressure sensors 114, 120, cameras 122, 136, microphones 124, 134, impact sensors 130, radar 132, and lidar 138. The plurality of sensors 102-138, disposed in or on the vehicle, may be used for various purposes, such as autonomous and semi-autonomous navigation and control, crash avoidance, position determination, etc., as well to provide sensor data regarding objects and people in or on the vehicle 100. The sensors 102-138 may include one or more of a wide variety of sensors capable of detecting a variety of information useful for navigation and collision avoidance. Each of the sensors 102-138 may be in wired or wireless communication with a control unit 140, as well as with each other. In particular, the sensors may include one or more cameras 122, 136 or other optical sensors or photo optic sensors. The sensors may further include other types of object detection and ranging sensors, such as radar 132, lidar 138, IR sensors, and ultrasonic sensors. The sensors may further include tire pressure sensors 114, 120, humidity sensors, temperature sensors, satellite geo-positioning system receivers 108, accelerometers, vibration sensors, gyroscopes, gravimeters, impact sensors 130, force meters, stress meters, strain sensors, fluid sensors, chemical sensors, gas content analyzers, pH sensors, radiation sensors, Geiger counters, neutron detectors, biological material sensors, microphones 124, 134, occupancy sensors 112, 116, 118, 126, 128, proximity sensors, and other sensors.

The vehicle control unit 140 may be configured to operate in a platoon mode and coordinate basic safety communication information with other vehicles in the platoon for generating and broadcasting proxy basic safety communications in accordance with various embodiments. Additionally, the control unit 140 may have a default setting for either operating or not operating as a designated platoon vehicle that coordinates and broadcasts the proxy basic safety communications. The default setting may be followed when the control unit 140 is not directed to operate otherwise.

The vehicle control unit 140 may be configured with processor-executable instructions to perform various embodiments using information received from various sensors, particularly the cameras 122, 136. In some embodiments, the control unit 140 may supplement the processing of camera images using distance and relative position (e.g., relative bearing angle) that may be obtained from radar 132 and/or lidar 138 sensors. The control unit 140 may further be configured to control steering, braking and speed of the vehicle 100 when operating in an autonomous or semi-autonomous mode using information regarding other vehicles determined using various embodiments.

Figure 1C:
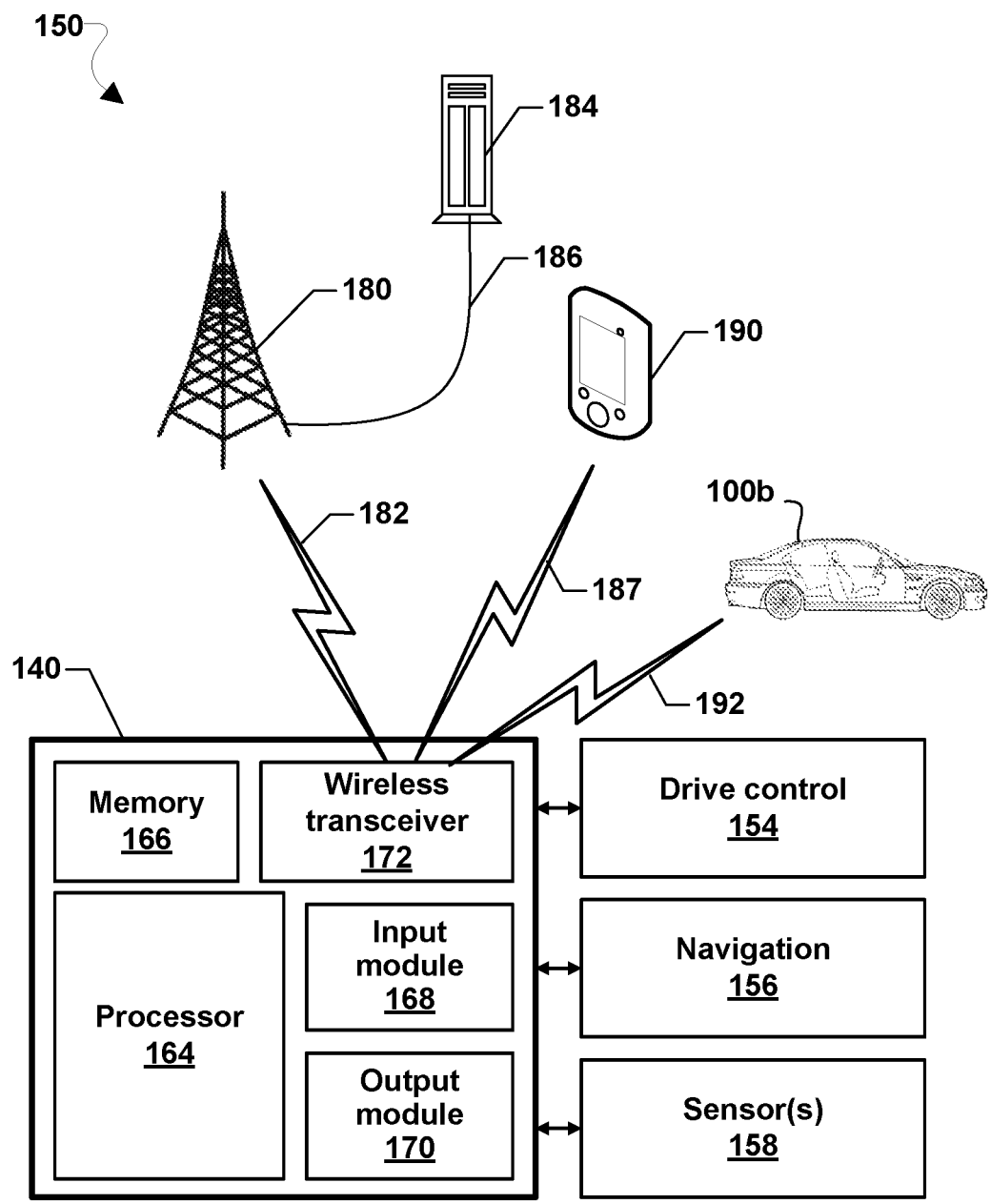
FIG. 1C is a component block diagram illustrating components of a vehicle suitable for implementing various embodiments.

FIG. 1C is a component block diagram illustrating a system 150 of components and support systems suitable for implementing various embodiments. With reference to FIGS. 1A, 1B, and 1C, a vehicle 100 may include a control unit 140, which may include various circuits and devices used to control the operation of the vehicle 100. In the example illustrated in FIG. 1C, the control unit 140 includes a processor 164, memory 166, an input module 168, an output module 170 and a wireless transceiver 172. The control unit 140 may be coupled to and configured to control drive control components 154, navigation components 156, and one or more sensors 158 of the vehicle 100.

As used herein, the terms "component," "system," "unit," "module," and the like include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a communication device and the communication device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

The control unit 140 may include a processor 164 that may be configured with processor-executable instructions to control maneuvering, navigation, and/or other operations of the vehicle 100, including operations of various embodiments. The processor 164 may be coupled to the memory 166. The control unit 140 may include the input module 168, the output module 170, and the wireless transceiver 172.

The wireless transceiver 172 may be configured for wireless communication. The wireless transceiver 172 may exchange signals 182 (e.g., command signals for controlling maneuvering, signals from navigation facilities, etc.) with a network transceiver 180, and may provide the signals 182 to the processor 164 and/or the navigation components 156. In some embodiments, the wireless transceiver 172 may enable the vehicle 100 to communicate with a wireless communication device 190 through a wireless communication link 187. The wireless communication link 187 may be a bidirectional or unidirectional communication link and may use one or more communication protocols. In some embodiments, the wireless transceiver 172 may enable the vehicle 100 to communicate with another vehicle 100b (e.g., to exchange basic safety communications) through a wireless communication link 192. The wireless communication link 192 may be a bidirectional or unidirectional communication link and may use one or more communication protocols.

The input module 168 may receive sensor data from one or more vehicle sensors 158 as well as electronic signals from other components, including the drive control components 154 and the navigation components 156. The output module 170 may be used to communicate with or activate various components of the vehicle 100, including the drive control components 154, the navigation components 156, and the sensor(s) 158.

The control unit 140 may be coupled to the drive control components 154 to control physical elements of the vehicle 100 related to maneuvering and navigation of the vehicle, such as the engine, motors, throttles, steering elements, flight control elements, braking or deceleration elements, and the like. The drive control components 154 may also include components that control other devices of the vehicle, including environmental controls (e.g., air conditioning and heating), external and/or interior lighting, interior and/or exterior informational displays (which may include a display screen or other devices to display information), safety devices (e.g., haptic devices, audible alarms, etc.), and other similar devices.

The control unit 140 may be coupled to the navigation components 156, and may receive data from the navigation components 156 and be configured to use such data to determine the present position and orientation of the vehicle 100, as well as an appropriate course toward a destination. In various embodiments, the navigation components 156 may include or be coupled to a global navigation satellite system (GNSS) receiver system (e.g., one or more Global Positioning System (GPS) receivers) enabling the vehicle 100 to determine its current position using GNSS signals. Alternatively, or in addition, the navigation components 156 may include radio navigation receivers for receiving navigation beacons or other signals from radio nodes, such as Wi-Fi access points, cellular network sites, radio station, remote computing devices, other vehicles, etc. Through control of the drive control components 154, the processor 164 may control the vehicle 100 to navigate and maneuver. The processor 164 and/or the navigation components 156 may be configured to communicate with a server 184 on a network 186 (e.g., the Internet) using a wireless connection signal 182 with a cellular data network transceiver 180 to receive commands to control maneuvering, receive data useful in navigation, provide real-time position reports, and assess other data.

The control unit 140 may be coupled to one or more sensors 158. The sensor(s) 158 may include the sensors 102-138, as described, and may be configured to provide a variety of data to the processor 164.

While the control unit 140 is described as including separate components, in some embodiments some or all of the components (e.g., the processor 164, the memory 166, the input module 168, the output module 170, and the wireless transceiver 172) may be integrated in a single device or module, such as a system-on-chip (SOC) processing device. Such an SOC processing device may be configured for use in vehicles and be configured, such as with processor-executable instructions executing in the processor 164, to perform operations of various embodiments when installed into a vehicle.

Figure 2A:
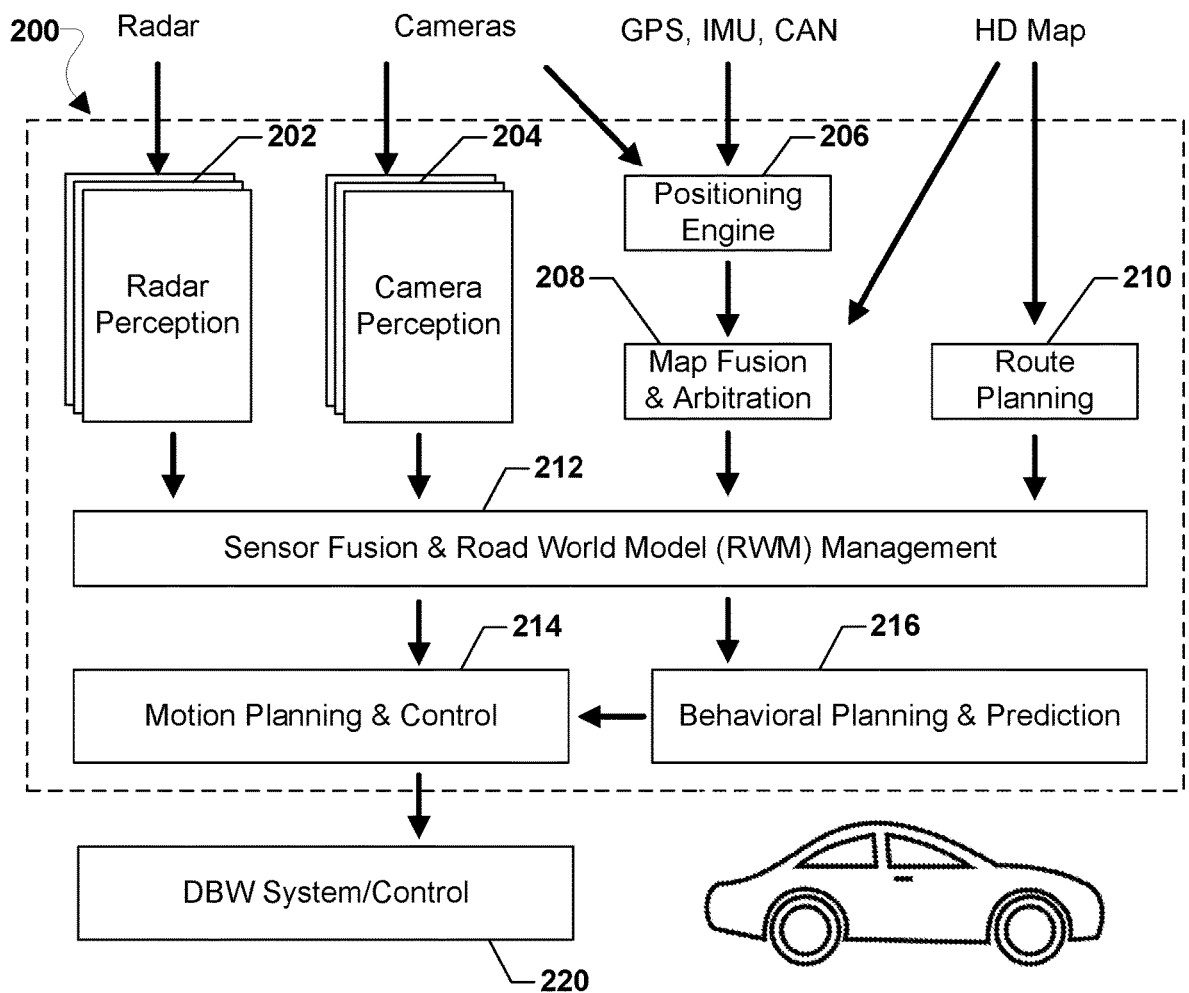
FIG. 2A is a component block diagram illustrating components of an example vehicle management system according to various embodiments.

FIG. 2A illustrates an example of subsystems, computational elements, computing devices or units within a vehicle management system 200, which may be utilized within a vehicle 100. With reference to FIGS. 1A-2A, in some embodiments, the various computational elements, computing devices or units within vehicle management system 200 may be implemented within a system of interconnected computing devices (i.e., subsystems), that communicate data and commands to each other (e.g., indicated by the arrows in FIG. 2A). In other embodiments, the various computational elements, computing devices or units within vehicle management system 200 may be implemented within a single computing device, such as separate threads, processes, algorithms or computational elements. Therefore, each subsystem/computational element illustrated in FIG. 2A is also generally referred to herein as "layer" within a computational "stack" that constitutes the vehicle management system 200. However, the use of the terms layer and stack in describing various embodiments are not intended to imply or require that the corresponding functionality is implemented within a single autonomous (or semi-autonomous) vehicle management system computing device, although that is a potential embodiment. Rather the use of the term "layer" is intended to encompass subsystems with independent processors, computational elements (e.g., threads, algorithms, subroutines, etc.) running in one or more computing devices, and combinations of subsystems and computational elements.

In various embodiments, the vehicle management system 200 may include a radar perception layer 202, a camera perception layer 204, a positioning engine layer 206, a map fusion and arbitration layer 208, a route planning layer 210, sensor fusion and road world model (RWM) management layer 212, motion planning and control layer 214, and behavioral planning and prediction layer 216. The layers 202-216 are merely examples of some layers in one example configuration of the vehicle management system 200. In other configurations consistent with various embodiments, other layers may be included, such as additional layers for other perception sensors (e.g., LIDAR perception layer, etc.), additional layers for planning and/or control, additional layers for modeling, etc., and/or certain of the layers 202-216 may be excluded from the vehicle management system 200. Each of the layers 202-216 may exchange data, computational results and commands as illustrated by the arrows in FIG. 2A. Further, the vehicle management system 200 may receive and process data from sensors (e.g., radar, lidar, cameras, inertial measurement units (IMU) etc.), navigation systems (e.g., GPS receivers, IMUs, etc.), vehicle networks (e.g., Controller Area Network (CAN) bus), and databases in memory (e.g., digital map data). The vehicle management system 200 may output vehicle control commands or signals to the drive by wire (DBW) system/control unit 220, which is a system, subsystem or computing device that interfaces directly with vehicle steering, throttle and brake controls. The configuration of the vehicle management system 200 and DBW system/control unit 220 illustrated in FIG. 2A is merely an example configuration and other configurations of a vehicle management system and other vehicle components may be used in the various embodiments. As an example, the configuration of the vehicle management system 200 and DBW system/control unit 220 illustrated in FIG. 2A may be used in a vehicle configured for autonomous or semi-autonomous operation while a different configuration may be used in a non-autonomous vehicle.

The radar perception layer 202 may receive data from one or more detection and ranging sensors, such as radar (e.g., 132) and/or lidar (e.g., 138), and process the data to recognize and determine locations of other vehicles and objects within a vicinity of the vehicle 100. The radar perception layer 202 may include use of neural network processing and artificial intelligence methods to recognize objects and vehicles, and pass such information on to the sensor fusion and RWM management layer 212.

The camera perception layer 204 may receive data from one or more cameras, such as cameras (e.g., 122, 136), and process the data to recognize and determine locations of other vehicles and objects within a vicinity of the vehicle 100. The camera perception layer 204 may include use of neural network processing and artificial intelligence methods to recognize objects and vehicles, and pass such information on to the sensor fusion and RWM management layer 212.

The positioning engine layer 206 may receive data from various sensors and process the data to determine a position of the vehicle 100. The various sensors may include, but is not limited to, GPS sensor, an IMU, and/or other sensors connected via a CAN bus. The positioning engine layer 206 may also utilize inputs from one or more cameras, such as cameras (e.g., 122, 136) and/or any other available sensor, such as radars, LIDARs, etc.

The map fusion and arbitration layer 208 may access data within a high definition (HD) map database and receive output received from the positioning engine layer 206 and process the data to further determine the position of the vehicle 100 within the map, such as location within a lane of traffic, position within a street map, etc. The HD map database may be stored in a memory (e.g., memory 166). For example, the map fusion and arbitration layer 208 may convert latitude and longitude information from GPS into locations within a surface map of roads contained in the HD map database. GPS position fixes include errors, so the map fusion and arbitration layer 208 may function to determine a best guess location of the vehicle within a roadway based upon an arbitration between the GPS coordinates and the HD map data. For example, while GPS coordinates may place the vehicle near the middle of a two-lane road in the HD map, the map fusion and arbitration layer 208 may determine from the direction of travel that the vehicle is most likely aligned with the travel lane consistent with the direction of travel. The map fusion and arbitration layer 208 may pass map-based location information to the sensor fusion and RWM management layer 212.

The route planning layer 210 may utilize the HD map, as well as inputs from an operator or dispatcher to plan a route to be followed by the vehicle 100 to a particular destination. The route planning layer 210 may pass map-based location information to the sensor fusion and RWM management layer 212. However, the use of a prior map by other layers, such as the sensor fusion and RWM management layer 212, etc., is not required. For example, other stacks may operate and/or control the vehicle based on perceptual data alone without a provided map, constructing lanes, boundaries, and the notion of a local map as perceptual data is received.

The sensor fusion and RWM management layer 212 may receive data and outputs produced by the radar perception layer 202, camera perception layer 204, map fusion and arbitration layer 208, and route planning layer 210, and use some or all of such inputs to estimate or refine the location and state of the vehicle 100 in relation to the road, other vehicles on the road, and other objects within a vicinity of the vehicle 100. For example, the sensor fusion and RWM management layer 212 may combine imagery data from the camera perception layer 204 with arbitrated map location information from the map fusion and arbitration layer 208 to refine the determined position of the vehicle within a lane of traffic. As another example, the sensor fusion and RWM management layer 212 may combine object recognition and imagery data from the camera perception layer 204 with object detection and ranging data from the radar perception layer 202 to determine and refine the relative position of other vehicles and objects in the vicinity of the vehicle. As another example, the sensor fusion and RWM management layer 212 may receive information from vehicle-to-vehicle (V2V) communications (such as via the CAN bus) regarding other vehicle positions and directions of travel, and combine that information with information from the radar perception layer 202 and the camera perception layer 204 to refine the locations and motions of other vehicles. The sensor fusion and RWM management layer 212 may output refined location and state information of the vehicle 100, as well as refined location and state information of other vehicles and objects in the vicinity of the vehicle, to the motion planning and control layer 214 and/or the behavior planning and prediction layer 216.

The sensor fusion and RWM management layer 212 may output location and state information of the vehicle 100, as well as refined location and state information of other vehicles and objects in the vicinity of the vehicle 100, to the motion planning and control layer 214, the behavior planning and prediction layer 216 and/or devices remote from the vehicle 100, such as a data server, other vehicles, etc., via wireless communications, such as through C-V2X connections, other wireless connections, etc.

As a still further example, the sensor fusion and RWM management layer 212 may monitor perception data from various sensors, such as perception data from a radar perception layer 202, camera perception layer 204, other perception layer, etc., and/or data from one or more sensors themselves to analyze conditions in the vehicle sensor data. The sensor fusion and RWM management layer 212 may be configured to detect conditions in the sensor data, such as sensor measurements being at, above, or below a threshold, certain types of sensor measurements occurring, etc., and may output the sensor data as part of the location and state information of the vehicle 100 provided to the behavior planning and prediction layer 216 and/or devices remote from the vehicle 100, such as a data server, other vehicles, etc., via wireless communications, such as through C-V2X connections, other wireless connections, etc.

The location and state information may be used to generate basic safety communications and may include vehicle descriptors associated with the vehicle and the vehicle owner and/or operator, such as: vehicle specifications (e.g., size, weight, color, on board sensor types, etc.); vehicle position, speed, acceleration, direction of travel, attitude, orientation, destination, fuel/power level(s), and other state information; vehicle emergency status (e.g., is the vehicle an emergency vehicle or private individual in an emergency); vehicle restrictions (e.g., heavy/wide load, turning restrictions, high occupancy vehicle (HOV) authorization, etc.); capabilities (e.g., all-wheel drive, four-wheel drive, snow tires, chains, connection types supported, on board sensor operating statuses, on board sensor resolution levels, etc.) of the vehicle; equipment problems (e.g., low tire pressure, weak brakes, sensor outages, etc.); owner/operator travel preferences (e.g., preferred lane, roads, routes, and/or destinations, preference to avoid tolls or highways, preference for the fastest route, etc.); permissions to provide sensor data to a data agency server (e.g., 184); and/or owner/operator identification information.

The behavioral planning and prediction layer 216 of the autonomous vehicle management system 200 may use the location and state information of the vehicle 100 and location and state information of other vehicles and objects output from the sensor fusion and RWM management layer 212 to predict future behaviors of other vehicles and/or objects. For example, the behavioral planning and prediction layer 216 may use such information to predict future relative positions of other vehicles in the vicinity of the vehicle based on own vehicle position and velocity and other vehicle positions and velocity. Such predictions may consider information from the HD map and route planning to anticipate changes in relative vehicle positions as host and other vehicles follow the roadway. The behavioral planning and prediction layer 216 may output other vehicle and object behavior and location predictions to the motion planning and control layer 214. Additionally, the behavior planning and prediction layer 216 may use object behavior in combination with location predictions to plan and generate control signals for controlling the motion of the vehicle 100. For example, based on route planning information, location in the roadway information, and relative locations and motions of other vehicles, the behavior planning and prediction layer 216 may determine that the vehicle 100 needs to change lanes and accelerate, such as to maintain or achieve minimum spacing from other vehicles, and/or prepare for a turn or exit. As a result, the behavior planning and prediction layer 216 may calculate or otherwise determine a steering angle for the wheels and a change to the throttle setting to be commanded to the motion planning and control layer 214 and DBW system/control unit 220 along with such various parameters necessary to effectuate such a lane change and acceleration. One such parameter may be a computed steering wheel command angle.

The motion planning and control layer 214 may receive data and information outputs from the sensor fusion and RWM management layer 212 and other vehicle and object behavior as well as location predictions from the behavior planning and prediction layer 216, and use this information to plan and generate control signals for controlling the motion of the vehicle 100 and to verify that such control signals meet safety requirements for the vehicle 100. For example, based on route planning information, location in the roadway information, and relative locations and motions of other vehicles, the motion planning and control layer 214 may verify and pass various control commands or instructions to the DBW system/control unit 220.

The DBW system/control unit 220 may receive the commands or instructions from the motion planning and control layer 214 and translate such information into mechanical control signals for controlling wheel angle, brake and throttle of the vehicle 100. For example, DBW system/control unit 220 may respond to the computed steering wheel command angle by sending corresponding control signals to the steering wheel controller.

In various embodiments, the vehicle management system 200 may include functionality that performs safety checks or oversight of various commands, planning or other decisions of various layers that could impact vehicle and occupant safety. Such safety check or oversight functionality may be implemented within a dedicated layer or distributed among various layers and included as part of the functionality. In some embodiments, a variety of safety parameters may be stored in memory and the safety checks or oversight functionality may compare a determined value (e.g., relative spacing to a nearby vehicle, distance from the roadway centerline, etc.) to corresponding safety parameter(s), and issue a warning or command if the safety parameter is or will be violated. For example, a safety or oversight function in the behavior planning and prediction layer 216 (or in a separate layer) may determine the current or future separate distance between another vehicle (as defined by the sensor fusion and RWM management layer 212) and the vehicle (e.g., based on the world model refined by the sensor fusion and RWM management layer 212), compare that separation distance to a safe separation distance parameter stored in memory, and issue instructions to the motion planning and control layer 214 to speed up, slow down or turn if the current or predicted separation distance violates the safe separation distance parameter. As another example, safety or oversight functionality in the motion planning and control layer 214 (or a separate layer) may compare a determined or commanded steering wheel command angle to a safe wheel angle limit or parameter, and issue an override command and/or alarm in response to the commanded angle exceeding the safe wheel angle limit.

Some safety parameters stored in memory may be static (i.e., unchanging over time), such as maximum vehicle speed. Other safety parameters stored in memory may be dynamic in that the parameters are determined or updated continuously or periodically based on vehicle state information and/or environmental conditions. Non-limiting examples of safety parameters include maximum safe speed, maximum brake pressure, maximum acceleration, and the safe wheel angle limit, all of which may be a function of roadway and weather conditions.

Figure 2B:
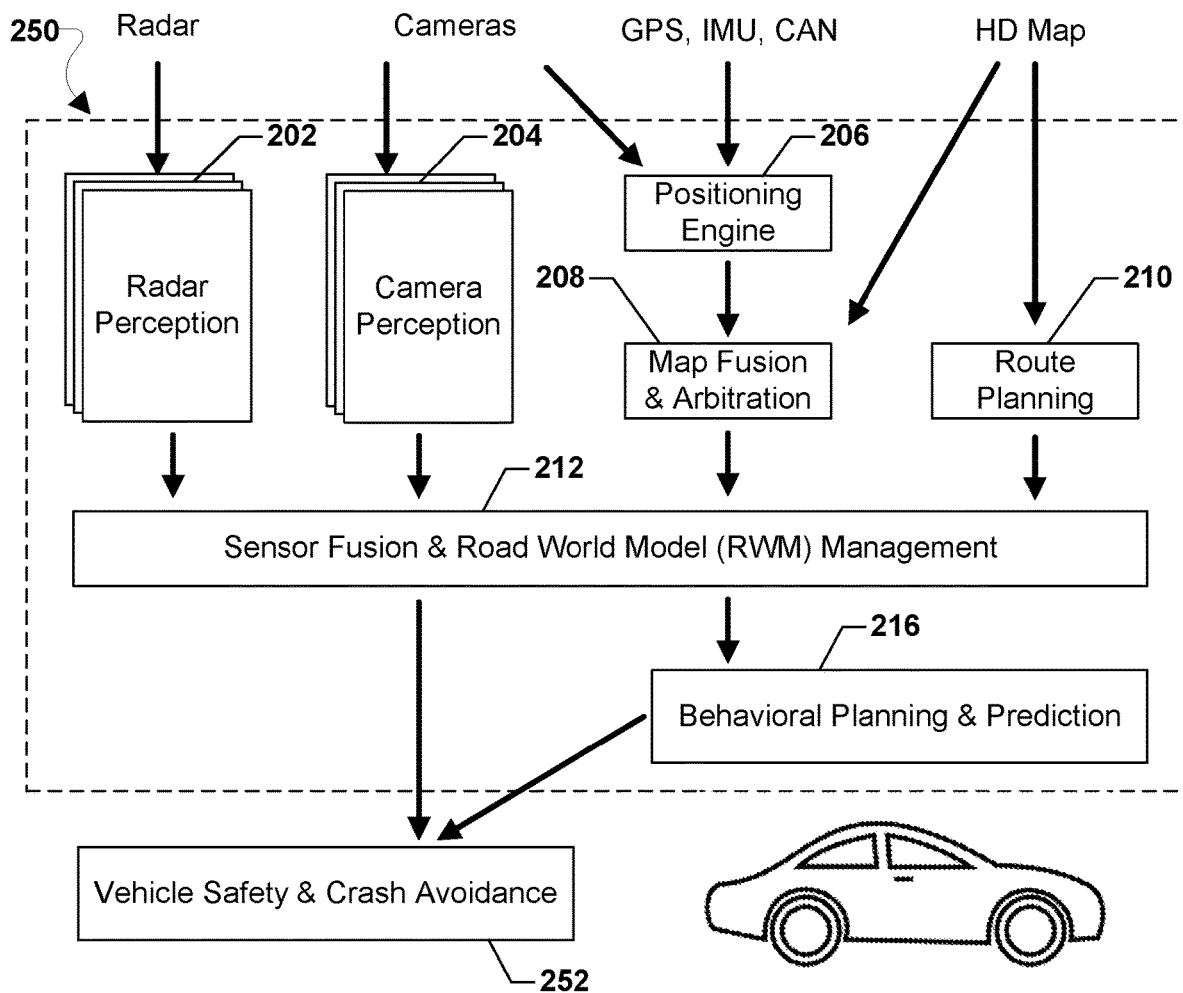
FIG. 2B is a component block diagram illustrating components of another example vehicle management system according to various embodiments.

FIG. 2B illustrates an example of subsystems, computational elements, computing devices or units within a vehicle management system 250, which may be utilized within a vehicle 100. With reference to FIGS. 1A-2B, in some embodiments, the layers 202, 204, 206, 208, 210, 212, and 216 of the vehicle management system 200 may be similar to those described with reference to FIG. 2A and the vehicle management system 250 may operate similar to the vehicle management system 200, except that the vehicle management system 250 may pass various data or instructions to a vehicle safety and crash avoidance system 252 rather than the DBW system/control unit 220. For example, the configuration of the vehicle management system 250 and the vehicle safety and crash avoidance system 252 illustrated in FIG. 2B may be used in a non-autonomous vehicle.

In various embodiments, the behavioral planning and prediction layer 216 and/or sensor fusion and RWM management layer 212 may output data to the vehicle safety and crash avoidance system 252. For example, the sensor fusion and RWM management layer 212 may output sensor data as part of refined location and state information of the vehicle 100 provided to the vehicle safety and crash avoidance system 252. The vehicle safety and crash avoidance system 252 may use the refined location and state information of the vehicle 100 to make safety determinations relative to the vehicle 100 and/or occupants of the vehicle 100. As another example, the behavioral planning and prediction layer 216 may output behavior models and/or predictions related to the motion of other vehicles to the vehicle safety and crash avoidance system 252. The vehicle safety and crash avoidance system 252 may use the behavior models and/or predictions related to the motion of other vehicles to make safety determinations relative to the vehicle 100 and/or occupants of the vehicle 100.

In various embodiments, the vehicle safety and crash avoidance system 252 may include functionality that performs safety checks or oversight of various commands, planning, or other decisions of various layers, as well as human driver actions, that could impact vehicle and occupant safety. In some embodiments, a variety of safety parameters may be stored in memory and the vehicle safety and crash avoidance system 252 may compare a determined value (e.g., relative spacing to a nearby vehicle, distance from the roadway centerline, etc.) to corresponding safety parameter(s), and issue a warning or command if the safety parameter is or will be violated. For example, a vehicle safety and crash avoidance system 252 may determine the current or future separate distance between another vehicle (as defined by the sensor fusion and RWM management layer 212) and the vehicle (e.g., based on the world model refined by the sensor fusion and RWM management layer 212), compare that separation distance to a safe separation distance parameter stored in memory, and issue instructions to a driver to speed up, slow down or turn if the current or predicted separation distance violates the safe separation distance parameter. As another example, a vehicle safety and crash avoidance system 252 may compare a human driver's change in steering wheel angle to a safe wheel angle limit or parameter, and issue an override command and/or alarm in response to the steering wheel angle exceeding the safe wheel angle limit.

Figure 3:
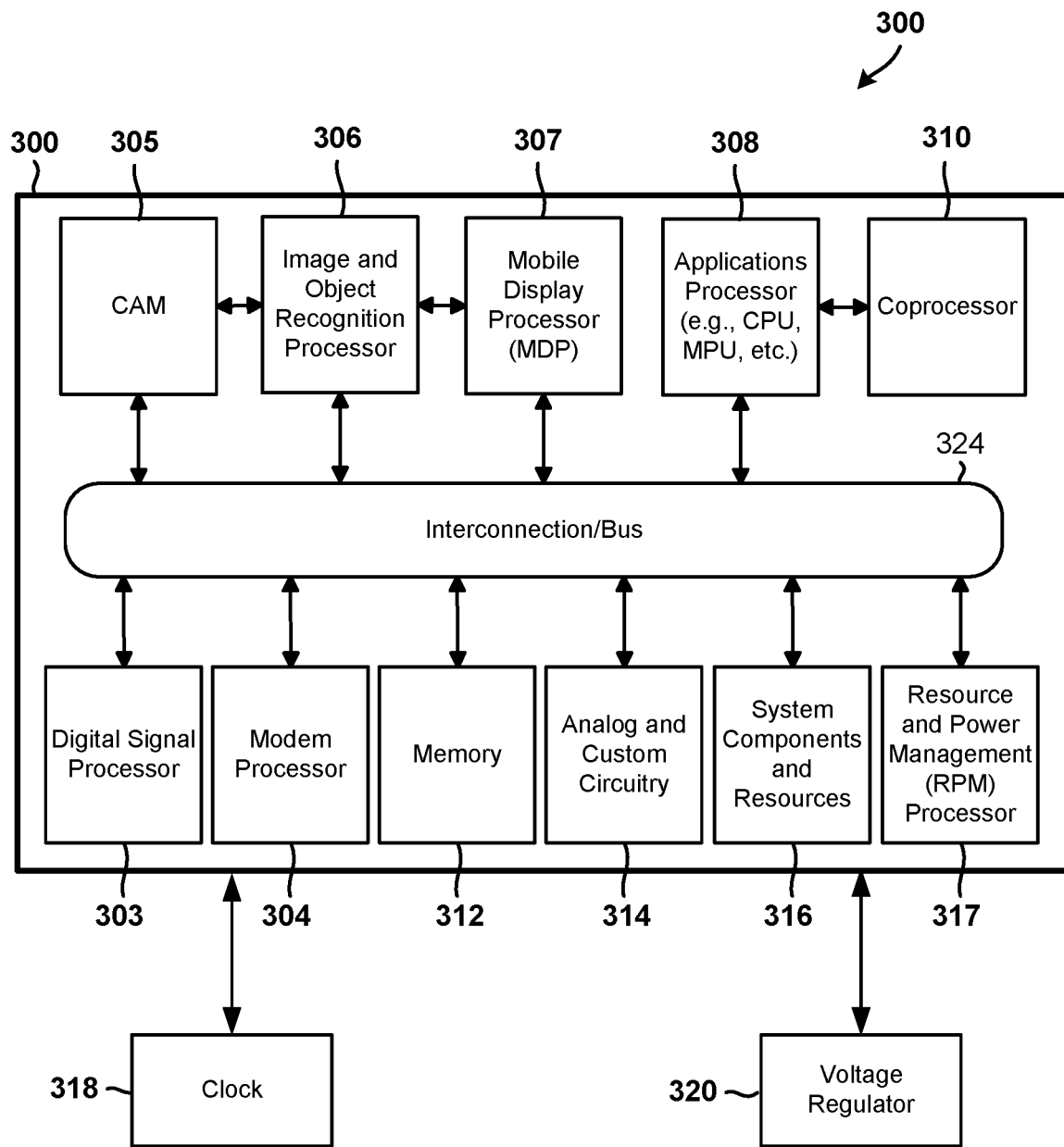
FIG. 3 is a block diagram illustrating components of an example system on chip for use in a vehicle that may be configured to broadcast, receive, and/or otherwise use intentions and/or motion plans in accordance with various embodiments.

FIG. 3 illustrates an example system-on-chip (SOC) architecture of a processing device SOC 300 suitable for implementing various embodiments in vehicles. With reference to FIGS. 1A-3, the processing device SOC 300 may include a number of heterogeneous processors, such as a digital signal processor (DSP) 303, a modem processor 304, an image and object recognition processor 306, a mobile display processor 307, an applications processor 308, and a resource and power management (RPM) processor 317. The processing device SOC 300 may also include one or more coprocessors 310 (e.g., vector co-processor) connected to one or more of the heterogeneous processors 303, 304, 306, 307, 308, 317. Each of the processors may include one or more cores, and an independent/internal clock. Each processor/core may perform operations independent of the other processors/cores. For example, the processing device SOC 300 may include a processor that executes a first type of operating system (e.g., FreeBSD, LINUX, OS X, etc.) and a processor that executes a second type of operating system (e.g., Microsoft Windows). In some embodiments, the applications processor 308 may be the SOC's 300 main processor, central processing unit (CPU), microprocessor unit (MPU), arithmetic logic unit (ALU), graphics processing unit (GPU), etc.

The processing device SOC 300 may include analog circuitry and custom circuitry 314 for managing sensor data, analog-to-digital conversions, wireless data transmissions, and for performing other specialized operations, such as processing encoded audio and video signals for rendering in a web browser. The processing device SOC 300 may further include system components and resources 316, such as voltage regulators, oscillators, phase-locked loops, peripheral bridges, data controllers, memory controllers, system controllers, access ports, timers, and other similar components used to support the processors and software clients (e.g., a web browser) running on a computing device.

The processing device SOC 300 also include specialized circuitry for camera actuation and management (CAM) 305 that includes, provides, controls and/or manages the operations of one or more cameras 122, 136 (e.g., a primary camera, webcam, 3D camera, etc.), the video display data from camera firmware, image processing, video preprocessing, video front-end (VFE), in-line JPEG, high definition video codec, etc. The CAM 305 may be an independent processing unit and/or include an independent or internal clock.

In some embodiments, the image and object recognition processor 306 may be configured with processor-executable instructions and/or specialized hardware configured to perform image processing and object recognition analyses involved in various embodiments. For example, the image and object recognition processor 306 may be configured to perform the operations of processing images received from cameras (e.g., 122, 136) via the CAM 305 to recognize and/or identify other vehicles, and otherwise perform functions of the camera perception layer 204 as described. In some embodiments, the processor 306 may be configured to process radar or lidar data and perform functions of the radar perception layer 202 as described.

The system components and resources 316, analog and custom circuitry 314, and/or CAM 305 may include circuitry to interface with peripheral devices, such as cameras 122, 136, radar 132, lidar 138, electronic displays, wireless communication devices, external memory chips, etc. The processors 303, 304, 306, 307, 308 may be interconnected to one or more memory elements 312, system components and resources 316, analog and custom circuitry 314, CAM 305, and RPM processor 317 via an interconnection/bus module 324, which may include an array of reconfigurable logic gates and/or implement a bus architecture (e.g., Core Connect, AMBA, etc.). Communications may be provided by advanced interconnects, such as high-performance networks-on chip (NoCs).

The processing device SOC 300 may further include an input/output module (not illustrated) for communicating with resources external to the SOC, such as a clock 318 and a voltage regulator 320. Resources external to the SOC (e.g., clock 318, voltage regulator 320) may be shared by two or more of the internal SOC processors/cores (e.g., the DSP 303, the modem processor 304, the image and object recognition processor 306, the MDP, the applications processor 308, etc.).

In some embodiments, the processing device SOC 300 may be included in a control unit (e.g., 140) for use in a vehicle (e.g., 100). The control unit may include communication links for communication with a telephone network (e.g., 180), the Internet, and/or a network server (e.g., 184) as described.

The processing device SOC 300 may also include additional hardware and/or software components that are suitable for collecting sensor data from sensors, including motion sensors (e.g., accelerometers and gyroscopes of an IMU), user interface elements (e.g., input buttons, touch screen display, etc.), microphone arrays, sensors for monitoring physical conditions (e.g., location, direction, motion, orientation, vibration, pressure, etc.), cameras, compasses, GPS receivers, communications circuitry (e.g., Bluetooth®, WLAN, Wi-Fi, etc.), and other well-known components of modern electronic devices.

Figure 4:
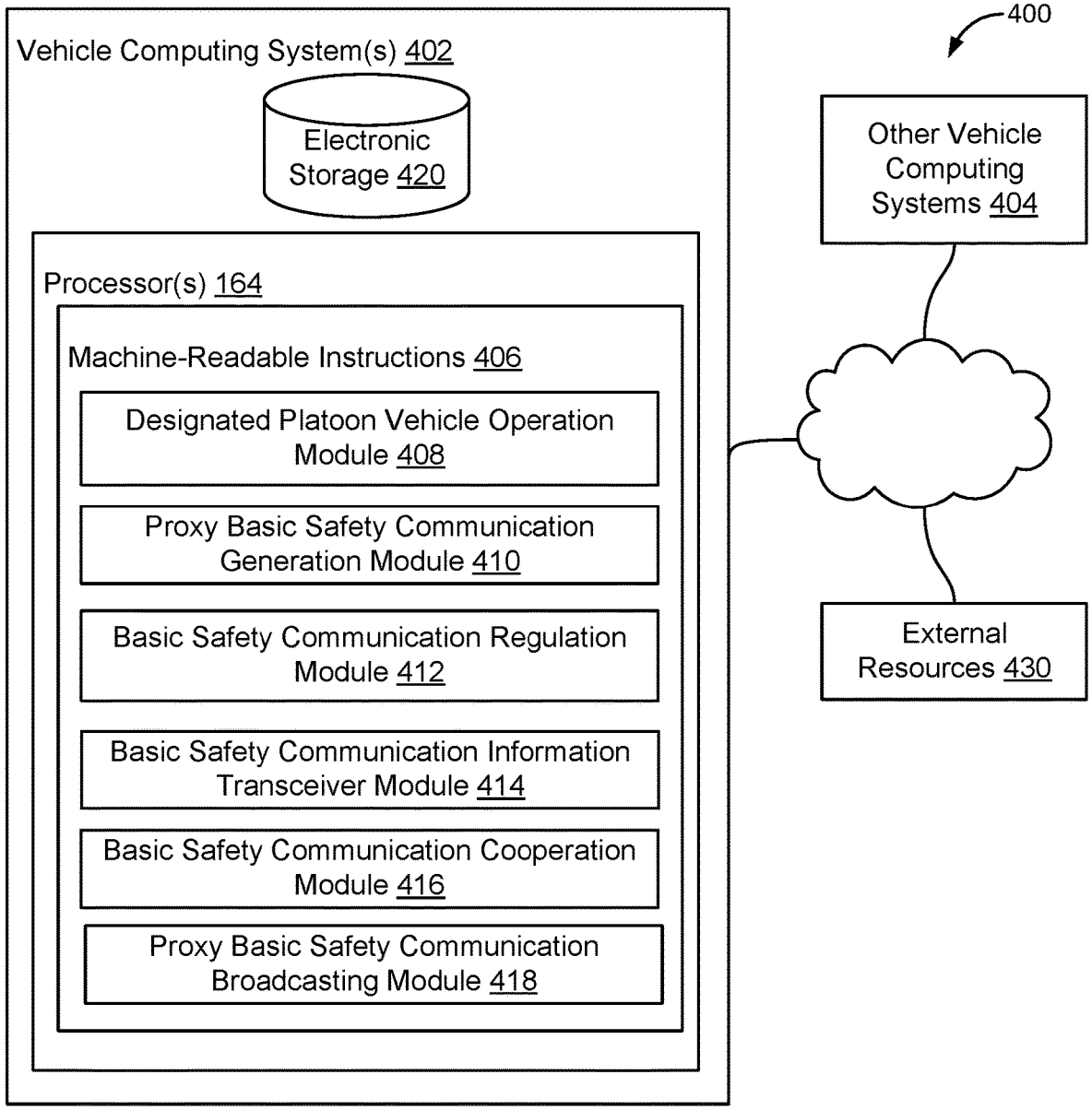
FIG. 4 is a component block diagram of an example system configured for collaborative headlight steering between vehicles according to various embodiments.

FIG. 4 shows a component block diagram illustrating a system 400 configured for vehicle to vehicle safety messaging congestion control for vehicles organized and traveling within a platoon in accordance with various embodiments. In some embodiments, the system 400 may include one or more vehicle computing systems 402 and one or more other vehicle computing systems 404 communicating via a wireless network. With reference to FIGS. 1A-4, the vehicle computing system(s) 402 may include a processor (e.g., 164), a processing device (e.g., 300), and/or a control unit (e.g., 104) (variously referred to herein as a "processor") of a vehicle (e.g., 100). The other vehicle computing system(s) 404 may include a processor (e.g., 164), a processing device (e.g., 300), and/or a control unit (e.g., 104) (variously referred to as a "processor") of a vehicle (e.g., 100).

The vehicle computing system(s) 402 may be configured by machine-executable instructions 406. Machine-executable instructions 406 may include one or more instruction modules. The instruction modules may include computer program modules. The instruction modules may include one or more of a designated platoon vehicle operation module 408, proxy basic safety communication generation module 410, basic safety communication regulation module 412, basic safety communication information transceiver module 414, basic safety communication cooperation module 416, proxy basic safety communication broadcasting module 418, and/or other modules.

The designated platoon vehicle operation module 408 may be configured to determine when the vehicle, in which the designated platoon vehicle operation module 408 is disposed (in contrast to other vehicles in the same platoon), operates as the designated platoon vehicle in the platoon for purposes of generating and/or transmitting the proxy basic safety communication. As a non-limiting example, the platoon leader may be selected to operate as the designated platoon vehicle. Alternatively, another platoon vehicle, other than the platoon leader, may be selected to operate as the designated platoon vehicle. In addition, in some embodiments, more than one platoon vehicle may be selected to operate as the designated platoon vehicle (e.g., a lead vehicle and a rear vehicle). The determination as to how many vehicles operate as the designated platoon vehicle may be based on platoon size, the size of one or more platoon vehicles, the size or type of roadway on which the platoon is on (e.g., the number of lanes, roadway speed limit, highway/local roads, etc.), and other considerations.

The designated platoon vehicle operation module 408 may also be configured to not broadcast basic safety communications or broadcast basic safety communications at a reduced power level while not operating as a designated platoon vehicle. In some embodiments, the designated platoon vehicle operation module 408 may also be configured to direct one or more platoon vehicles to cease broadcasting basic safety communications or to broadcast basic safety communications at a reduced power level.

The designated platoon vehicle operation module 408 may also be configured to coordinate, compile, and manage other aspects of platooning. When forming a platoon, the designated platoon vehicle operation module 408 may consider information received from each other platoon vehicle, such as a destination, timing constraints, current position (e.g., geographic coordinates or relative position within the platoon or with respect to another vehicle in the platoon), and speed. Selection of and changes to platoon formations may be determined according to factors, such as the number of vehicles platooning or the road geometry. For example, a single lane road may be limited to a single in-line formation, while a highway with more than one lane may allow the platoon to form as a multi-lane cluster of vehicles. Also, the platoon need not utilize all the lanes available on a highway (e.g., leaving the left-most lane free for other vehicles to pass).

The designated platoon vehicle operation module 408 may consider platoon goals or priorities when implementing the platoon control plan or sub-elements thereof. For example, if fuel or energy efficiency is a priority for the platoon, an in-line, closely spaced formation may be used to gain efficiencies from drafting. Similarly, one or more of the vehicles in the platoon may be directed to dim or turn off their headlights to minimize energy expenditures.

Vehicles that participate in a platoon formation may be equipped with the designated platoon vehicle operation module 408 or some equivalent thereof. In addition, platooning vehicles may require V2V communications capabilities, as well as an ability to implement at least a core subset of the platoon control plan, communication protocols, and associated processing and maneuvering functions. Some vehicles may be capable and configured to take any role in the platoon formation (e.g., the leader and/or designated platoon vehicle). Other vehicles, based on vehicle equipment or driver/occupant characteristics, may be constrained to a smaller range of roles within the formation (e.g., not operating as the designated platoon vehicle).

The proxy basic safety communication generation module 410 may be configured to generate the proxy basic safety communication on behalf of all or most of the vehicles in the platoon, including for example position and dimension information of the whole platoon. As a non-limiting example, the proxy basic safety communication generation module 410 may be configured to include sufficient detail in the proxy basic safety communication regarding the platoon for the proxy basic safety communication to broadcast information equivalent to or a reasonable substitute for the information that would be provided by basic safety communications that would otherwise be transmitted by every vehicle in the platoon. In addition, the position and dimension information of the platoon included in the proxy basic safety communication may identify a location of a first vehicle in the platoon, a location of a last vehicle in the platoon, and a speed of vehicles in the platoon. Position and dimension information of the platoon included in the proxy basic safety communication may further include a number of vehicles in the platoon, a number of roadway lanes occupied by vehicles in the platoon, and/or a destination of the platoon.

The basic safety communication regulation module 412 may be configured to control when, how, and to what extend a vehicle may broadcast basic safety communications. In contrast to conventional vehicles that broadcast basic safety communications (e.g., BSM) regularly and continuously, various embodiments may regulate basic safety communication broadcasts to reduce communication congestion cause by platooning, such as ceasing BSM broadcasts, reducing the transmission power of BSM broadcasts, changing how frequently BSMs are broadcast, changing the radio frequency and/or communication protocol used to communicate vehicle information to the designated platoon vehicles (s), etc. In some embodiments, the designated vehicle may broadcast the proxy basic safety communication at a higher power level than conventional safety messages (e.g., at a power level greater than specified by a government standard) so that such transmission can be received at greater than minimum distances (e.g., >1000 meters) consistent with the larger number of vehicles involved. In some embodiments, vehicles in a platoon and not operating as the designated platoon vehicle may broadcast basic safety communications at a reduced power level (e.g., at a power level less than specified by a government standard) so that their messages will not interfere with communications by other vehicles except at short distances (e.g., <<1000 meters).

In some embodiments, the basic safety communication regulation module 412 may be configured to cause a vehicle to not broadcast basic safety communications while in a platoon and not operating as the designated platoon vehicle.

The basic safety communication information transceiver module 414 may be configured to receive position and speed information from other vehicles in the platoon and/or transmit position and speed information to a designated platoon vehicle in the platoon when not operating as the designated platoon vehicle. The received/transmitted position and speed information may be transmitted on a frequency different from the frequency on which the proxy basic safety communications are broadcast. The position and speed information may be used when generating the proxy basic safety communications.

The basic safety communication cooperation module 416 may be configured to cooperate on the contents included in the proxy basic safety communication with a second vehicle in the platoon that is also designated to broadcast basic safety communications on behalf of the platoon such that the vehicle generates and broadcasts a first proxy basic safety communication for or on behalf of a first subgroup of the platoon and the second vehicle generates and broadcasts a second proxy basic safety communication for or on behalf of a second subgroup of the platoon.

The proxy basic safety communication broadcasting module 418 may be configured to broadcast the proxy basic safety communication on behalf of all vehicles in the platoon. As a non-limiting example, broadcasting the proxy basic safety communication may include broadcasting the proxy basic safety communication using more power than basic safety communications are broadcast by vehicles not acting as a designated platoon vehicle. As a further alternative, the proxy basic safety communication broadcasting module 418 may be configured to cease broadcasting the proxy basic safety communications on behalf of the platoon in response to another vehicle becoming the designated platoon vehicle in the platoon.

In some embodiments, vehicle computing system(s) 402, other vehicle computing system(s) 404 may communicate with one another via a wireless network 430, such as V2V wireless communication links. Additionally, the vehicle computing system(s) 402 and other vehicle computing system(s) 404 may communicate via wireless communication networks that provide access to external resources 430. For example, such electronic communication links may be established, at least in part, via a network such as the Internet and/or other networks.

Other vehicle computing systems 404 may include one or more processors configured to execute computer program modules the same as or similar to the machine-executable instructions 406 described above. In some embodiments, each vehicle in a platoon may be configured to operate the same or a consistent manner as every other vehicle in the platoon, including the ability to operate as the designated platoon vehicle. In some embodiments, some vehicles in a platoon may be configure with less capability that the designated platoon vehicle (e.g., with a subset of the modules 408-418).

External resources 430 may include sources of information outside of system 400, external entities participating with the system 400, and/or other resources. For example, external resource 430 may include map data resources, highway information systems, weather forecast services, etc. In some embodiments, some or all the functionality attributed herein to external resources 430 may be provided by resources included in system 400.

Vehicle computing system(s) 402 may include electronic storage 420, one or more processors 164, and/or other components. Vehicle computing system(s) 402 may include communication lines, or ports to enable the exchange of information with a network and/or other vehicle computing system. Illustration of vehicle computing system(s) 402 in FIG. 4 is not intended to be limiting. Vehicle computing system(s) 402 may include a plurality of hardware, software, and/or firmware components operating together to provide the functionality attributed herein to vehicle computing system(s) 402. For example, vehicle computing system(s) 402 may be implemented by a cloud of vehicle computing systems operating together as vehicle computing system(s) 402.

Electronic storage 420 may include non-transitory storage media that electronically stores information. The electronic storage media of electronic storage 420 may include one or both of system storage that is provided integrally (i.e., substantially non-removable) with vehicle computing system(s) 402 and/or removable storage that is removably connectable to vehicle computing system(s) 402 via, for example, a port (e.g., a universal serial bus (USB) port, a firewire port, etc.) or a drive (e.g., a disk drive, etc.). Electronic storage 420 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 420 may include one or more virtual storage resources (e.g., cloud storage, a virtual private network, and/or other virtual storage resources). Electronic storage 420 may store software algorithms, information determined by processor(s) 164, information received from vehicle computing system(s) 402, information received from other vehicle computing system(s) 404, and/or other information that enables vehicle computing system(s) 402 to function as described herein.

Processor(s) 164 may be configured to provide information processing capabilities in vehicle computing system(s) 402. As such, processor(s) 164 may include one or more of a digital processor, an analog processor, a digital circuit designed to process information, an analog circuit designed to process information, a state machine, and/or other mechanisms for electronically processing information. Although processor(s) 164 is shown in FIG. 4 as a single entity, this is for illustrative purposes only. In some embodiments, processor(s) 164 may include a plurality of processing units. These processing units may be physically located within the same device, or processor(s) 164 may represent processing functionality of a plurality of devices operating in coordination. Processor(s) 164 may be configured to execute modules 408, 410, 412, 414, 416, and/or 418, and/or other modules. Processor(s) 164 may be configured to execute modules 408, 410, 412, 414, 416, and/or 418, and/or other modules by software; hardware; firmware; some combination of software, hardware, and/or firmware; and/or other mechanisms for configuring processing capabilities on processor(s) 164. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 408, 410, 412, 414, 416, and/or 418 are illustrated in FIG. 4 as being implemented within a single processing unit, in embodiments in which processor(s) 164 includes multiple processing units, one or more of modules 408, 410, 412, 414, 416, and/or 418 may be implemented remotely from the other modules. The description of the functionality provided by the different modules 408, 410, 412, 414, 416, and/or 418 described below is for illustrative purposes, and is not intended to be limiting, as any of modules 408, 410, 412, 414, 416, and/or 418 may provide more or less functionality than is described. For example, one or more of modules 408, 410, 412, 414, 416, and/or 418 may be eliminated, and some or all of its functionality may be provided by other ones of modules 408, 410, 412, 414, 416, and/or 418. As another example, processor(s) 164 may be configured to execute one or more additional modules that may perform some or all of the functionality attributed below to one of modules 408, 410, 412, 414, 416, and/or 418.

Figure 5A:
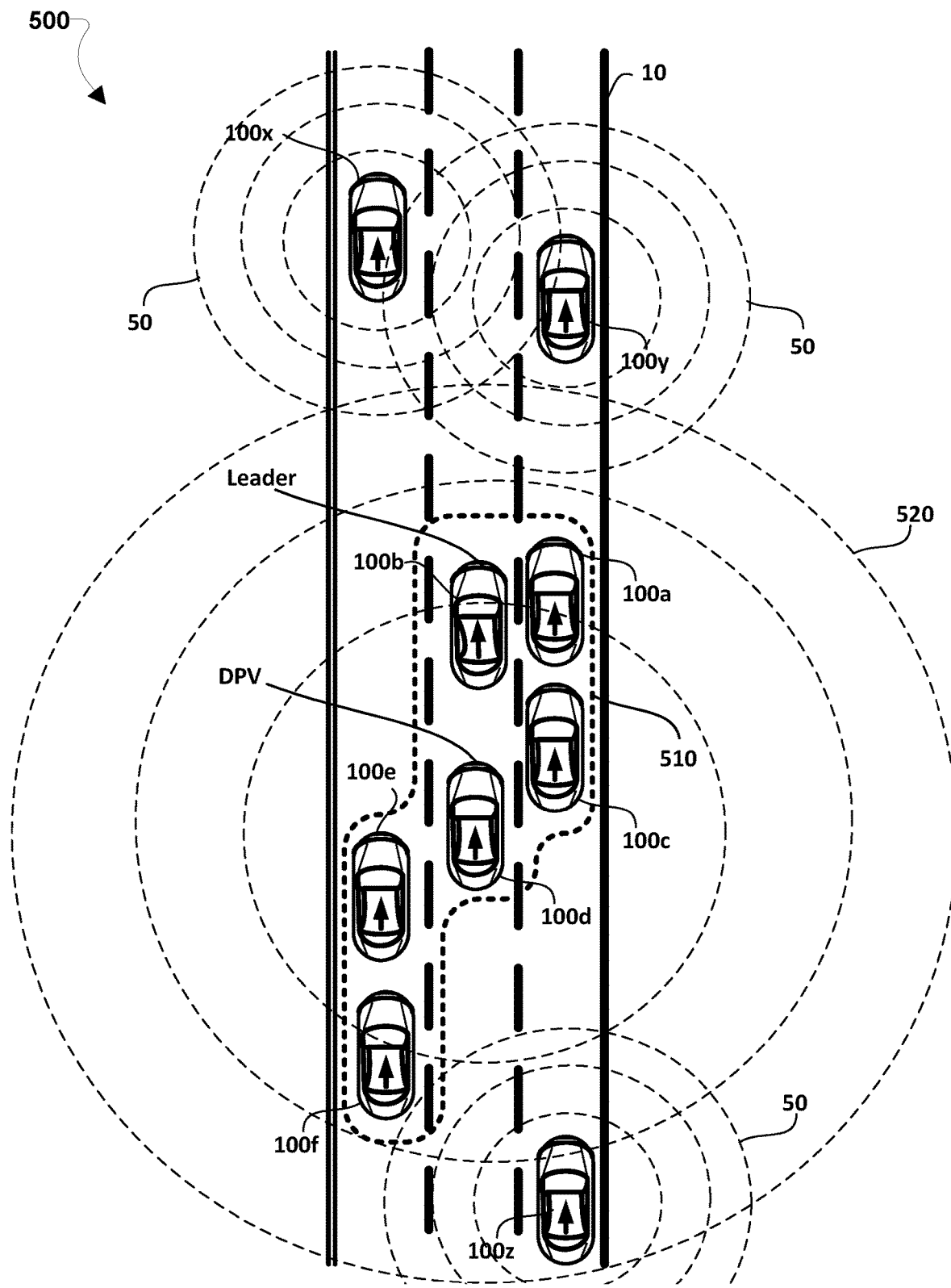
FIGS. 5A, 5B, and 5C illustrate examples of vehicle safety messaging congestion control for vehicles organized and traveling within a platoon in accordance with various embodiments.

FIG. 5A illustrates an environment 500 in which a platoon 510 including six (6) vehicles 100*a*, 100*b*, 100*c*, 100*d*, 100*e*, 100*f* is may implement embodiment methods for vehicle to vehicle safety messaging congestion control for vehicles organized and traveling within a platoon. With reference to FIGS. 1-5A, the environment 500 includes three (3) vehicles 100*x*, 100*y*, 100*z*, that are not operating as part of the platoon 510 (referred to as non-platoon vehicles) but are traveling on the same part of a roadway 10 as the platoon 510. The roadway 10 happens to be a three-lane road, with all lanes dedicated to travel in the same direction. The methods and systems of various embodiments may be applied to vehicles on any pathway, whether it is a paved and clearly marked road.

Referring to FIG. 5A, the non-platoon vehicles 100*x*, 100*y*, 100*z*, are each broadcasting conventional basic safety messages 50 (illustrated as three concentric dashed-line circles. In in the platoon 510, a designated platoon vehicle (designated as "DPV" in the figure) is broadcasting a proxy basic safety communication 520 on behalf of all vehicles in the platoon (also illustrated as three concentric dashed-line circles. The platoon vehicles that are not operating as the designated platoon vehicle do not broadcast basic safety communications while operating as part of the platoon 510. In accordance with some embodiments, the proxy basic safety communication 520 is shown as being broadcast at higher power levels by larger concentric circles than the basic safety message 50 broadcast by the non-platoon vehicles 100*x*, 100*y*, 100*z*. As this figure illustrates, various embodiments, broadcast of the proxy basic safety communication 520 by one designated vehicle reduces the number of radio frequency broadcasts emitted on the roadway 10, since fewer than all vehicles in the platoon 510 are broadcasting such safety messages.

In some embodiments, the platoon 510 may include a leader vehicle (i.e., Leader) that is different from the designated platoon vehicle. However, the methods and systems of various embodiments may be applied to a platoon in which the leader vehicle operates as the designated platoon vehicle. In some embodiments, the designated platoon vehicle may be selected as the platoon vehicle with the best or most powerful antenna. Alternatively, the designated platoon vehicle may be selected based on a closest proximity to nearby non-platoon vehicles.

Figure 5B:
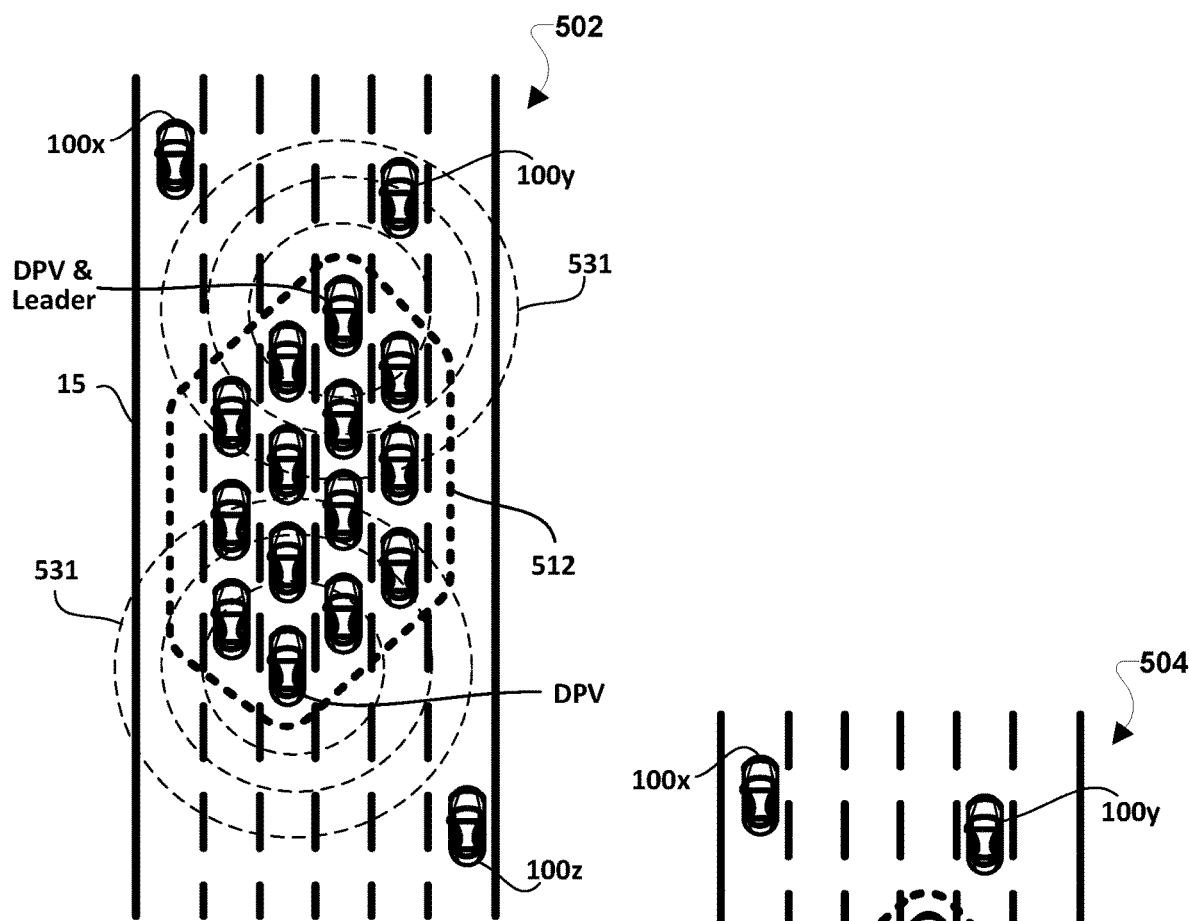

FIG. 5B illustrates an environment 502 in which a platoon 512 of fourteen vehicles are using methods for vehicle to vehicle safety messaging congestion control for vehicles organized and traveling within a platoon. With reference to FIGS. 1-5B, the environment 502 includes three (3) non-platoon vehicles 100*x*, 100*y*, 100*z*, traveling on the same part of a highway 15. The highway 15 happens to be a six-lane roadway, with all lanes dedicated to travel in the same direction.

In some embodiments, the platoon 512 may include a leader vehicle that also operates as a designated platoon vehicle (labeled "DPV & Leader" in the figure) broadcasting proxy basic safety communications 531. In addition, the figure shows the platoon 512 including a second vehicle operating as a designated platoon vehicle and also broadcasting the proxy basic safety communications 531 in accordance with some embodiments. For example, the platoon 512 includes one designated platoon vehicle located at the front of the platoon 512 and another designated platoon vehicle located at the rear of the platoon 512.

Figure 5C:
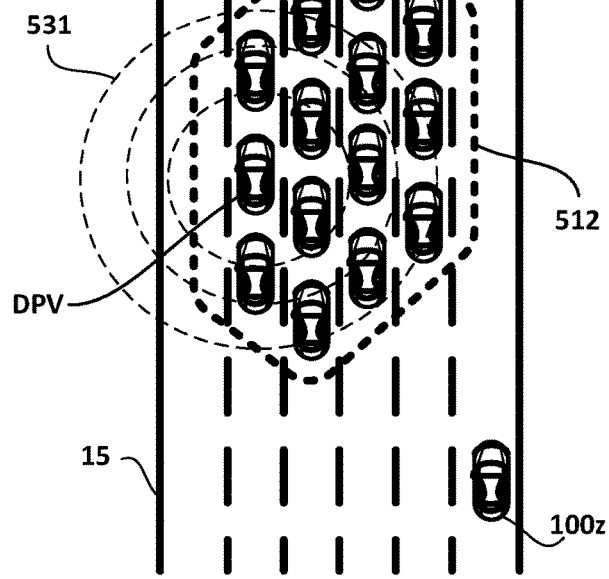

FIG. 5C illustrates an environment 504 in which the platoon 512 is using methods for vehicle to vehicle safety messaging congestion control for vehicles organized and traveling within a platoon. With reference to FIGS. 1-5C, the platoon 512 may include a vehicle that operates as the designated platoon vehicle located at a position other than a lead or rear position. The role of designated platoon vehicle may be assigned to any vehicle in the platoon, and may be shifted from one vehicle to the next periodically, such as on a round-robin basis. In this way, the platoon vehicles may take turns operating as the designated platoon vehicle so that each vehicle is able to perform the role periodically. Thus, one platoon vehicle may cease broadcasting the proxy basic safety communications 531 on behalf of the platoon 512 in response to another vehicle becoming the designated platoon vehicle in the platoon 512 and taking over the role of broadcasting the proxy basic safety communications 531. In some embodiments, not all platoon vehicles may participate in the round-robin rotation periodically operating as the designated platoon vehicle. For example, the platoon vehicles not located around the perimeter of the platoon 512 may not operate as the designated platoon vehicle. Alternatively, vehicles needing to conserve power (e.g., low on fuel) may not participate in the rotation of the designated platoon vehicle role. Also, the order of rotation among vehicles participating in the rotation of the designated platoon vehicle role may be a clockwise rotation, counter-clockwise rotation, random rotation, or other pattern of rotation.

FIGS. 6A-6H illustrate operations of methods 600, 603, 605, 607, 609, 611, 613, and 615, respectively, for vehicle to vehicle safety messaging congestion control for vehicles organized and traveling within a platoon in accordance with various embodiments. With reference to FIGS. 1A-6H, the methods 600, 603, 605, 607, 609, 611, 613, and 615 may be implemented in a processor (e.g., 164), a processing device (e.g., 300), and/or a control unit (e.g., 104) (variously referred to as a "processor") of a vehicle (e.g., 100, 100a-f). In some embodiments, the methods 600, 603, 605, 607, 609, 611, 613, and 615 may be performed by one or more layers within a vehicle management system stack, such as a vehicle management system (e.g., 200, 250). In some embodiments, the methods 600, 603, 605, 607, 609, 611, 613, and 615 may be performed by a processor independently from, but in conjunction with, a vehicle control system stack, such as the vehicle management system. For example, the methods 600, 603, 605, 607, 609, 611, 613, and 615 may be implemented as a stand-alone software module or within dedicated hardware that monitors data and commands from/within the vehicle management system and is configured to take actions and store data as described.

Figure 6A:
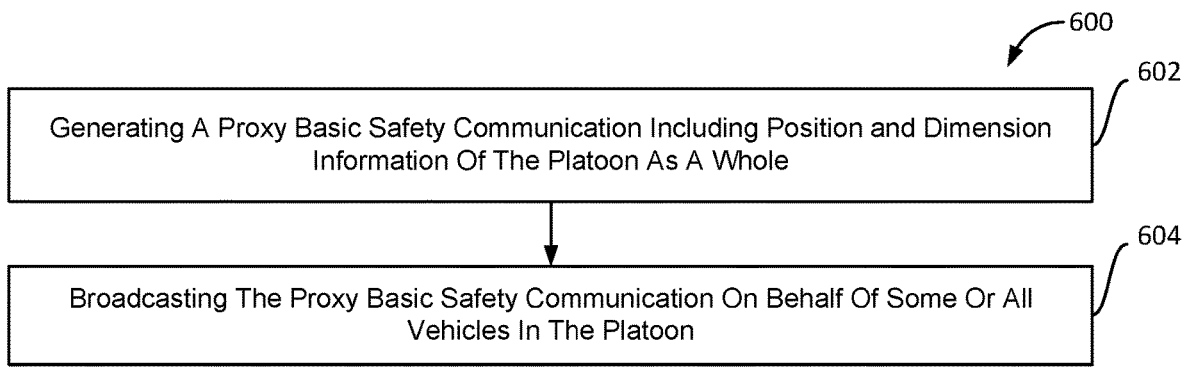
FIGS. 6A, 6B, 6C, 6D, 6E, 6F, 6G and/or 6H are process flow diagrams of example methods for vehicle safety messaging congestion control for vehicles organized and traveling within a platoon according to various embodiments.

FIG. 6A illustrates a method 600 of vehicle safety messaging congestion control for vehicles organized and traveling within a platoon in accordance with various embodiments.

In block 602, a processor of a vehicle while operating as a designated platoon vehicle, may generate a proxy basic safety communication message that includes, for example, position and dimension information of the platoon as a whole. For example, the position and dimension information of the platoon included in the proxy basic safety communication may include a location of a first vehicle in the platoon, a location of a last vehicle in the platoon, and a speed of vehicles in the platoon. The position and dimension information of the platoon included in the proxy basic safety communication may further include the number of vehicles in the platoon. The position and dimension information of the platoon included in the proxy basic safety communication may further include a number of roadway lanes occupied by vehicles in the platoon. The position and dimension information of the platoon included in the proxy basic safety communication further may include a destination of the platoon, or at least a location at which one or more vehicles will leave the platoon.

In block 604, the processor of the vehicle, while operating as a designated platoon vehicle, may broadcast the proxy basic safety communication on behalf of some or all vehicles in the platoon. In some embodiments, the broadcast proxy basic safety communications may be on behalf of the platoon as a whole but not necessarily on behalf of any vehicle in the platoon. Broadcasting the proxy basic safety communication may include broadcasting the proxy basic safety communication using more power than basic safety communications are broadcast by vehicles not within a platoon (e.g., greater than power levels specified in standards for basic safety communications).

The processor may repeat the operations in blocks 602 and 604 to periodically or continuously generate and broadcast proxy basic safety communications.

Figure 6B:
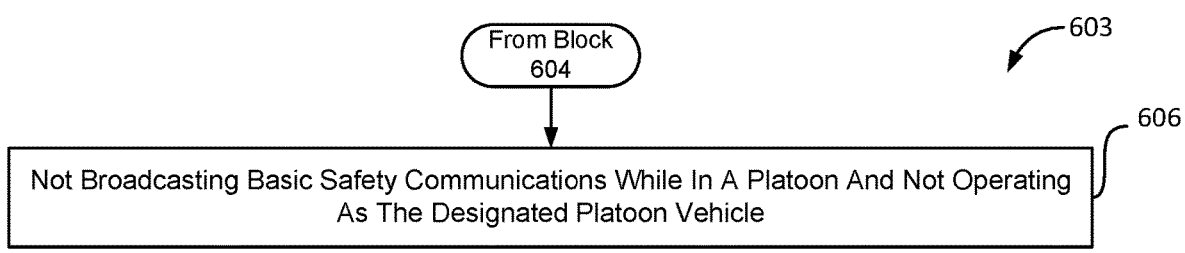

FIG. 6B illustrates a method 603 including an operation that may be further implemented by vehicles organized and traveling within a platoon in accordance with some embodiments.

In block 606, the processor may not broadcast basic safety communications while in a platoon but not operating as the designated platoon vehicle. Refraining from broadcasting basic safety communications while another vehicle broadcasts proxy basic safety communications on behalf of the platoon reduces the number of such broadcasts emanating from a given area of the freeway, thus reducing or avoiding congestion on the frequencies of basic safety communications that could otherwise be caused by multiple vehicles operating in a platoon.

In some embodiments, the processor may repeat any or all of the operations in blocks 602, 604, and 606 to repeatedly or continuously while operating in a platoon.

Figure 6C:
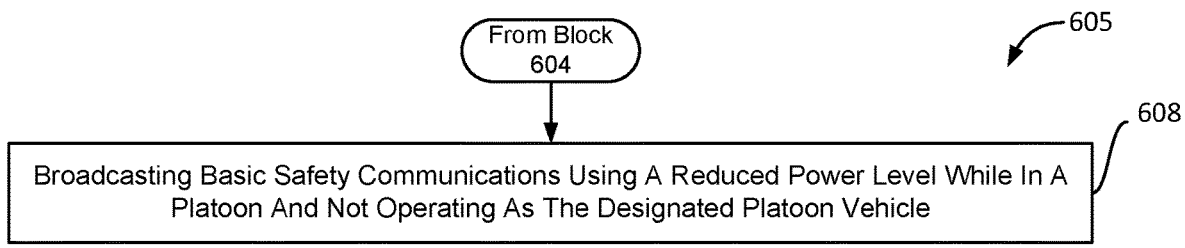

FIG. 6C illustrates a method 605 including an operation that may be further implemented by vehicles organized and traveling within a platoon in accordance with some embodiments.

In block 608, the processor may broadcast basic safety communications using a reduced power level while in a platoon and not operating as the designated platoon vehicle. Reducing the power level of basic safety communication broadcasts while another vehicle broadcasts proxy basic safety communications on behalf of the platoon reduces the range at which such broadcasts may interfere with the broadcasts from other vehicles, thus reducing congestion on the frequencies of basic safety communications that could otherwise be caused by multiple vehicles operating an a platoon.

In some embodiments, the processor may repeat any or all the operations in blocks 602, 604, and 608 to repeatedly or continuously control vehicle safety messaging congestion.

Figure 6D:
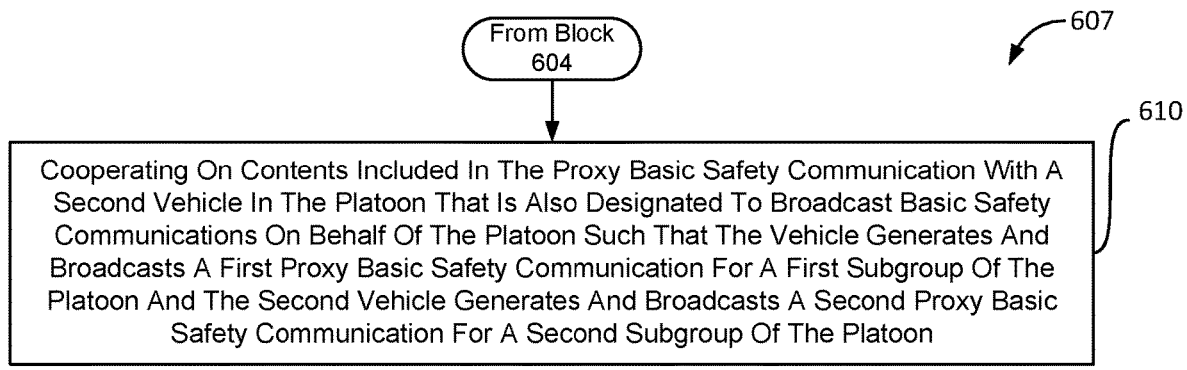

FIG. 6D illustrates a method 607 including an operation that may be further implemented by vehicles organized and traveling within a platoon in accordance with some embodiments.

In block 610, the processor may cooperate on contents included in the proxy basic safety communications with a second vehicle in the platoon that is also designated to broadcast basic safety communications on behalf of the platoon. Such cooperation may enable the vehicle to generate and broadcast a first proxy basic safety communication for a first subgroup of the platoon and enable the second vehicle to generate and broadcast a second proxy basic safety communication for a second subgroup of the platoon. Such cooperation may include exchanging via a wireless communication link information that will be included in each proxy basic safety communication to ensure consistency, avoid duplication, or otherwise ensure that the information received by other vehicles provides an accurate representation of the platoon as a whole, as well as of the constituent vehicles.

In some embodiments, the processor may repeat any or all the operations in blocks 602, 604, and 610 to repeatedly or continuously broadcast proxy basic safety communications.

Figure 6E:
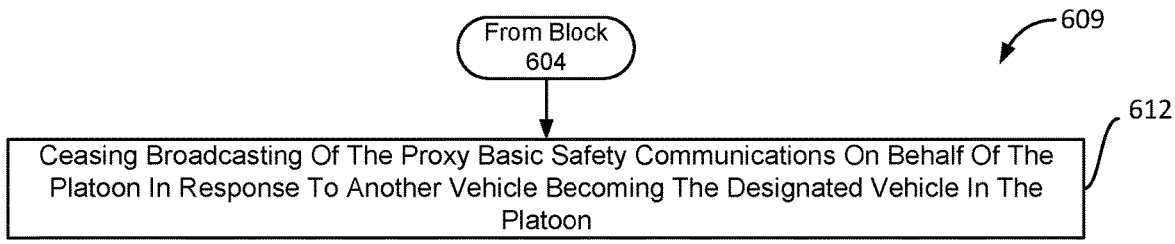

FIG. 6E illustrates a method 609 of including an operation that may be further implemented by vehicles organized and traveling within a platoon in accordance with some embodiments.

In block 612, the processor may cease broadcasting of the proxy basic safety communications on behalf of the platoon in response to another vehicle becoming the designated platoon vehicle in the platoon.

In some embodiments, the processor may repeat any or all the operations in blocks 602, 604, and 612 to repeatedly or continuously control vehicle safety messaging congestion.

Figure 6F:
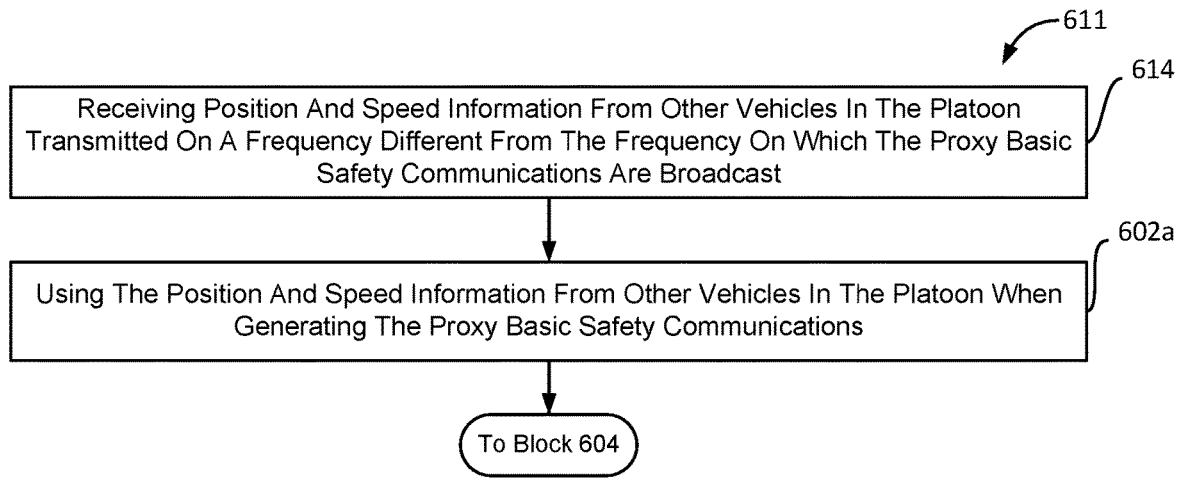

FIG. 6F illustrates a method 611 of operations for generating proxy basic safety communications in block 602 for controlling vehicle safety messaging congestion for vehicles organized and traveling within a platoon in accordance with some embodiments.

In block 614, the processor may receive position and speed information from other vehicles in the platoon transmitted on a frequency different from the frequency on which the proxy basic safety communications are broadcast. By receiving position, speed, destination, and other information messages from vehicles forming the platoon over frequency different from the frequencies used for broadcasting vehicle safety messages for intra-platoon communications reduces the amount of message traffic on the broadcasting vehicle safety message frequencies. This enables the designated vehicle processor to receive the types of information from other vehicles that the processor requires to generate proxy basic safety communications on behalf of the entire platoon.

In block 602a, the processor may use the position and speed information from other vehicles in the platoon when generating the proxy basic safety communications on behalf of the entire platoon.

The processor may then broadcast the generated proxy basic safety communications on behalf of the entire platoon in block 604 as described.

In some embodiments, the processor may repeat any or all the operations in blocks 614, 602a, and 604 to repeatedly or continuously broadcast proxy basic safety communications.

Figure 6G:
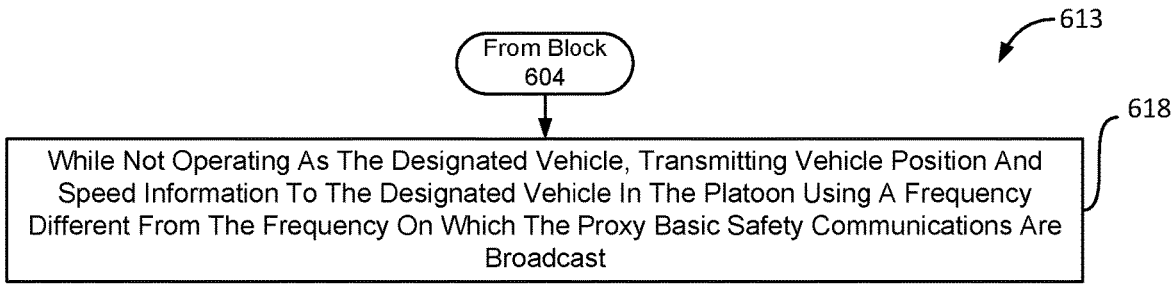

FIG. 6G illustrates a method 613 of vehicle safety messaging congestion control for vehicles organized and traveling within a platoon in accordance with some embodiments.

In block 618, while not operating as the designated platoon vehicle, the processor may transmit vehicle position and speed information to the designated platoon vehicle in the platoon using a frequency different from the frequency on which the proxy basic safety communications are broadcast. Using a different frequency for intra-platoon communications reduces the amount of message traffic on the frequencies used for broadcasting vehicle safety messages, while providing to the designated platoon vehicle or vehicles position, speed, destination, and other information that the designated vehicles require to generate proxy basic safety communications on behalf of the entire platoon.

In some embodiments, the processor may repeat any or all the operations in blocks 602, 604, and 618 to repeatedly or continuously control vehicle safety messaging congestion.

Figure 6H:
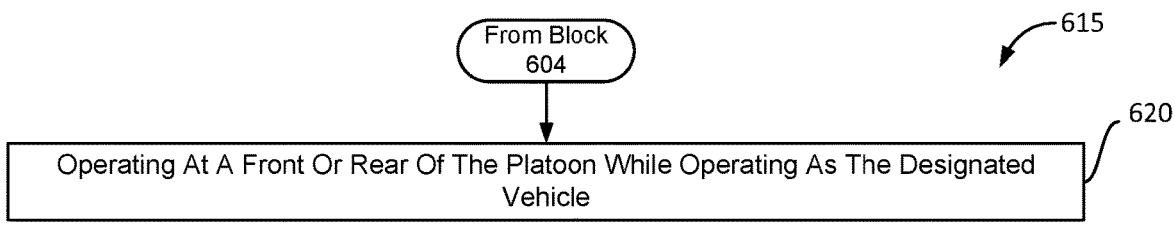

FIG. 6H illustrates a method 615 of vehicle safety messaging congestion control for vehicles organized and traveling within a platoon in accordance with some embodiments.

In block 620, the processor may operate at a front or a rear position within the platoon while operating as the designated platoon vehicle.

In some embodiments, the processor may repeat any or all the operations in blocks 602, 604, and 620 to repeatedly or continuously control vehicle safety messaging congestion.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the blocks of various embodiments must be performed in the order presented. As will be appreciated by one of skill in the art the order of blocks in the foregoing embodiments may be performed in any order. Words such as "thereafter," "then," "next," etc. are not intended to limit the order of the blocks; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm blocks described in connection with the embodiments disclosed herein may be implemented as electronic hardware, computer software, or combinations of both. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of various embodiments.

The hardware used to implement the various illustrative logics, logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of communication devices, e.g., a combination of a DSP and a microprocessor, a plurality of microprocessors, one or more microprocessors in conjunction with a DSP core, or any other such configuration. Alternatively, some blocks or methods may be performed by circuitry that is specific to a given function.

In various embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present embodiments. Various modifications to these embodiments will be readily apparent to those skilled in the art, and the generic principles defined herein may be applied to other embodiments without departing from the scope of the embodiments. Thus, various embodiments are not intended to be limited to the embodiments shown herein but are to be accorded the widest scope consistent with the following claims and the principles and novel features disclosed herein.

What is claimed is:

1. A method executed by a processor of a vehicle within a platoon, comprising:
   while operating as a designated platoon vehicle:
   generating a proxy basic safety communication including position and dimension information of the platoon as a whole; and
   broadcasting the proxy basic safety communication on behalf of vehicles in the platoon using more power than basic safety communications are broadcast by non-platoon vehicles.

2. The method of claim 1, wherein broadcasting the proxy basic safety communication comprises broadcasting the proxy basic safety communication using more power than basic safety communications that are broadcast by a vehicle in the platoon not operating as a designated platoon vehicle.

3. The method of claim 1, further comprising not broadcasting basic safety communications while in the platoon and not operating as the designated platoon vehicle.

4. The method of claim 1, further comprising broadcasting basic safety communications using a reduced power level while in the platoon and not operating as the designated platoon vehicle.

5. The method of claim 1, wherein the position and dimension information of the platoon included in the proxy basic safety communication comprise a location of a first vehicle in the platoon, a location of a last vehicle in the platoon, a number of vehicles in the platoon, and a speed of vehicles in the platoon.

6. The method of claim 5, wherein the position and dimension information of the platoon included in the proxy basic safety communication further comprises a number of roadway lanes occupied by vehicles in the platoon.

7. The method of claim 1, wherein the proxy basic safety communication further comprises a destination of the platoon.

8. The method of claim 1, further comprising cooperating on contents included in the proxy basic safety communication with a second vehicle in the platoon that is also designated to broadcast basic safety communications on behalf of the platoon such that the vehicle generates and broadcasts a first proxy basic safety communication for a first subgroup of the platoon and the second vehicle generates and broadcasts a second proxy basic safety communication for a second subgroup of the platoon.

9. The method of claim 1, further comprising ceasing broadcasting the proxy basic safety communication on behalf of the platoon in response to another vehicle becoming the designated platoon vehicle in the platoon.

10. The method of claim 1, further comprising:
    receiving position and speed information from other vehicles in the platoon transmitted on a frequency different from the frequency on which the proxy basic safety communication is broadcast; and using the position and speed information from other vehicles in the platoon when generating the proxy basic safety communication.

11. The method of claim 1, further comprising:
    while not operating as the designated platoon vehicle, transmitting vehicle position and speed information to the designated platoon vehicle in the platoon using a frequency different from the frequency on which the proxy basic safety communication is broadcast.

12. The method of claim 1, further comprising operating at a front or rear of the platoon while operating as the designated platoon vehicle.

13. A vehicle, comprising:
    a wireless transceiver; and
    a computing system coupled to the wireless transceiver and configured with processor-executable instruction to:
    generate a proxy basic safety communication including position and dimension information of a platoon of vehicles as a whole while operating as a designated platoon vehicle; and
    broadcast the proxy basic safety communication on behalf of the vehicles in the platoon using more power than basic safety communications are broadcast by non-platoon vehicles.

14. The vehicle of claim 13, wherein the computing system is further configured with processor-executable instruction to use the wireless transceiver to broadcast the proxy basic safety communication on behalf of the vehicles in the platoon using more power than basic safety communications that are broadcast by a vehicle in the platoon not operating as a designated platoon vehicle.

15. The vehicle of claim 13, wherein the computing system is further configured with processor-executable instruction to not broadcast basic safety communications while in the platoon and not operating as the designated platoon vehicle.

16. The vehicle of claim 13, wherein the computing system is further configured with processor-executable instruction to broadcasting basic safety communications via the wireless transceiver using a reduced power level while in the platoon and not operating as the designated platoon vehicle.

17. The vehicle of claim 13, wherein the computing system is further configured with processor-executable instruction to generate the proxy basic safety communication including a location of a first vehicle in the platoon, a location of a last vehicle in the platoon, a number of vehicles in the platoon, a speed of vehicles in the platoon, and a number of roadway lanes occupied by vehicles in the platoon.

18. The vehicle of claim 13, wherein the computing system is further configured with processor-executable instruction to cooperate on contents included in the proxy basic safety communication with a second vehicle in the platoon that is also designated to broadcast basic safety communications on behalf of the platoon such that the vehicle generates and broadcasts a first proxy basic safety communication for a first subgroup of the platoon and the second vehicle generates and broadcasts a second proxy basic safety communication for a second subgroup of the platoon.

19. The vehicle of claim 13, wherein the computing system is further configured with processor-executable instruction to cease broadcasting the proxy basic safety communication on behalf of the platoon in response to another vehicle becoming the designated platoon vehicle in the platoon.

20. The vehicle of claim 13, wherein the computing system is further configured with processor-executable instruction to:
    receive via the wireless transceiver position and speed information from other vehicles in the platoon transmitted on a frequency different from the frequency on which the proxy basic safety communication is broadcast; and
    use the position and speed information from other vehicles in the platoon when generating the proxy basic safety communication.

21. The vehicle of claim 13, wherein the computing system is further configured with processor-executable instruction to transmit vehicle position and speed information using a frequency different from the frequency on which the proxy basic safety communication is broadcast while not operating as the designated platoon vehicle.

22. A computing system configured for use in a vehicle, comprising:
    a processor configured with processor-executable instruction to:
        generate a proxy basic safety communication including position and dimension information of a platoon of vehicles as a whole while the vehicle is operating as a designated platoon vehicle; and
        cause a wireless transceiver of the vehicle to broadcast the proxy basic safety communication on behalf of the vehicles in the platoon using more power than basic safety communications are broadcast by non-platoon vehicles.

23. The computing system of claim 22, wherein the computing system is further configured with processor-executable instruction to broadcast the proxy basic safety communication on behalf of the vehicles in the platoon using more power than basic safety communications that are broadcast by a vehicle in the platoon not operating as a designated platoon vehicle.

24. The computing system of claim 22, wherein the computing system is further configured with processor-executable instruction to not broadcast basic safety communications while in the platoon and not operating as the designated platoon vehicle.

25. The computing system of claim 22, wherein the computing system is further configured with processor-executable instruction to broadcasting basic safety communications using a reduced power level while in the platoon and not operating as the designated platoon vehicle.

26. The computing system of claim 22, wherein the computing system is further configured with processor-executable instruction to generate the proxy basic safety communication including a location of a first vehicle in the platoon, a location of a last vehicle in the platoon, a number of vehicles in the platoon, a speed of vehicles in the platoon, and a number of roadway lanes occupied by vehicles in the platoon.

27. The computing system of claim 22, wherein the computing system is further configured with processor-executable instruction to cooperate on contents included in the proxy basic safety communication with a second vehicle in the platoon that is also designated to broadcast basic safety communications on behalf of the platoon such that the vehicle generates and broadcasts a first proxy basic safety communication for a first subgroup of the platoon and the second vehicle generates and broadcasts a second proxy basic safety communication for a second subgroup of the platoon.

28. The computing system of claim 22, wherein the computing system is further configured with processor-executable instruction to cease broadcasting the proxy basic safety communication on behalf of the platoon in response to another vehicle becoming the designated platoon vehicle in the platoon.

29. The computing system of claim 22, wherein the computing system is further configured with processor-executable instruction to:
    receive via the wireless transceiver position and speed information from other vehicles in the platoon transmitted on a frequency different from the frequency on which the proxy basic safety communication is broadcast; and
    use the position and speed information from other vehicles in the platoon when generating the proxy basic safety communication.

30. A non-transitory processor-readable storage medium having stored thereon processor-executable instructions configured to cause a computing system of a vehicle to perform operations comprising:
    while operating as a designated platoon vehicle within a platoon of vehicles:
        generating a proxy basic safety communication including position and dimension information of the platoon as a whole; and
        broadcasting the proxy basic safety communication on behalf of vehicles in the platoon using more power than basic safety communications are broadcast by non-platoon vehicles.

* * * * *